United States Patent
Hurst et al.

(10) Patent No.: US 11,231,111 B2
(45) Date of Patent: Jan. 25, 2022

(54) PUMP VALVE SEAT WITH SUPPLEMENTAL RETENTION

(71) Applicant: Halliburton Energy Services, Inc., Houston, TX (US)

(72) Inventors: Justin Lee Hurst, Healdton, OK (US); James Alan Olis, Duncan, OK (US); Joseph A. Beisel, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/411,898

(22) Filed: May 14, 2019

(65) Prior Publication Data

US 2020/0362970 A1 Nov. 19, 2020

(51) Int. Cl.
*F16K 1/42* (2006.01)
*F04B 53/10* (2006.01)
*F16K 3/02* (2006.01)

(52) U.S. Cl.
CPC ........ *F16K 3/0272* (2013.01); *F04B 53/1087* (2013.01); *F16K 1/427* (2013.01)

(58) Field of Classification Search
CPC ...... F04B 53/1087; F16K 3/0272; F16K 1/42; F16K 1/425; F16K 1/427
USPC ......................................... 251/360, 362, 365
See application file for complete search history.

(56) References Cited

U.S. PATENT DOCUMENTS

| | | |
|---|---|---|
| 1,662,725 A | 3/1928 | Toney, Jr. |
| 1,891,460 A * | 12/1932 | Vlahek ................... F16K 1/427 251/359 |
| 2,301,355 A * | 11/1942 | Armentrout ............ F16K 1/427 138/45 |
| 2,673,519 A | 3/1954 | Halliburton |
| 2,678,006 A | 5/1954 | Gray |
| 3,005,412 A | 10/1961 | Camp |
| 3,229,640 A | 1/1966 | Williams |
| 3,299,417 A | 1/1967 | Sibthorpe |
| 3,301,197 A | 1/1967 | Dodson et al. |
| 3,380,247 A | 4/1968 | Colmerauer |
| 3,459,363 A | 8/1969 | Miller |

(Continued)

FOREIGN PATENT DOCUMENTS

| | | |
|---|---|---|
| CH | 257522 A | 10/1948 |
| DE | 19808724 A1 | 9/1998 |

(Continued)

OTHER PUBLICATIONS

Acknowledgement receipt and specification for patent application entitled, "Pump Fluid End with Easy Access Suction Valve," by Justin L. Hurst, et al., filed May 14, 2019 as U.S. Appl. No. 16/411,891.

(Continued)

*Primary Examiner* — Kelsey E Cary
(74) *Attorney, Agent, or Firm* — Conley Rose, P.C.; Rodney B. Carroll

(57) ABSTRACT

A valve seat comprising a primary retention component to retain the valve seat in a valve seat housing upon seating of the valve seat in the valve seat housing, and a secondary retention component to at least temporarily retain the valve seat in the valve seat housing during seating of the valve seat in the valve seat housing, whereafter the valve seat is primarily retained in the valve seat housing via the primary retention component.

17 Claims, 10 Drawing Sheets

(56) References Cited

U.S. PATENT DOCUMENTS

| | | | |
|---|---|---|---|
| 3,489,170 A * | 1/1970 | Leman | F16K 1/385 |
| | | | 137/516.29 |
| 3,516,434 A | 6/1970 | Noss | |
| 3,664,371 A | 5/1972 | Schneider | |
| 3,724,813 A * | 4/1973 | Baumann | F16K 1/42 |
| | | | 251/360 |
| 3,801,066 A | 4/1974 | Miles et al. | |
| 3,887,305 A | 6/1975 | Ito | |
| 4,341,235 A | 7/1982 | Nord | |
| 4,395,050 A * | 7/1983 | Wirz | F16K 1/2263 |
| | | | 251/332 |
| 4,478,561 A | 10/1984 | Elliston | |
| 4,784,588 A | 11/1988 | Miyashita et al. | |
| 4,850,392 A | 7/1989 | Crump et al. | |
| 4,939,923 A | 7/1990 | Sharp | |
| 5,040,408 A | 8/1991 | Webb | |
| 5,061,159 A | 10/1991 | Pryor | |
| 5,072,622 A | 12/1991 | Roach et al. | |
| 5,176,025 A | 1/1993 | Butts | |
| 5,343,738 A | 9/1994 | Skaggs | |
| 5,403,168 A | 4/1995 | Evenson | |
| 5,664,703 A | 9/1997 | Reifenberger et al. | |
| 5,720,325 A | 2/1998 | Grantham | |
| 5,924,853 A | 7/1999 | Pacht | |
| 6,032,699 A | 3/2000 | Cochran et al. | |
| 6,082,392 A | 7/2000 | Watkins, Jr. | |
| 6,164,188 A | 12/2000 | Miser | |
| 6,342,272 B1 | 1/2002 | Halliwell | |
| 6,607,010 B1 | 8/2003 | Kashy | |
| 6,935,161 B2 | 8/2005 | Hutchinson | |
| 7,798,165 B2 | 9/2010 | McClung, Jr. | |
| 8,234,911 B2 | 8/2012 | Jax | |
| 8,360,751 B2 | 1/2013 | Duncan | |
| 8,366,408 B2 | 2/2013 | Wago et al. | |
| 8,418,363 B2 | 4/2013 | Patel | |
| 8,506,262 B2 | 8/2013 | Leugemors et al. | |
| 8,550,102 B2 | 10/2013 | Small | |
| 8,590,614 B2 | 11/2013 | Surjaatmadja et al. | |
| 9,499,895 B2 | 11/2016 | Langan et al. | |
| 9,528,508 B2 | 12/2016 | Thomeer et al. | |
| 9,617,654 B2 | 4/2017 | Rajagopalan et al. | |
| 9,822,894 B2 | 11/2017 | Bayyouk et al. | |
| 2003/0173538 A1 | 9/2003 | Brennecke et al. | |
| 2007/0044848 A1 | 3/2007 | Norman | |
| 2007/0145323 A1* | 6/2007 | Weingarten | F16K 1/427 |
| | | | 251/363 |
| 2007/0267076 A1 | 11/2007 | Strauss et al. | |
| 2008/0011057 A1 | 1/2008 | Spaolonzi et al. | |
| 2009/0041588 A1 | 2/2009 | Hunter et al. | |
| 2009/0041596 A1 | 2/2009 | Ponomarev et al. | |
| 2009/0159133 A1 | 6/2009 | Popke et al. | |
| 2009/0194174 A1 | 8/2009 | Morgan et al. | |
| 2009/0246051 A1 | 10/2009 | Kim | |
| 2009/0278069 A1 | 11/2009 | Blanco et al. | |
| 2010/0098568 A1 | 4/2010 | Marica | |
| 2010/0126250 A1 | 5/2010 | Jax | |
| 2010/0135833 A1 | 6/2010 | Schwegman | |
| 2011/0180740 A1 | 7/2011 | Marica | |
| 2012/0148431 A1 | 6/2012 | Gabriel | |
| 2012/0223267 A1 | 9/2012 | Marica | |
| 2012/0279721 A1 | 11/2012 | Surjaatmadja et al. | |
| 2012/0312402 A1 | 12/2012 | Tyler | |
| 2013/0061942 A1 | 3/2013 | Hulsey | |
| 2013/0202457 A1* | 8/2013 | Bayyouk | F04B 53/162 |
| | | | 417/279 |
| 2013/0319220 A1 | 12/2013 | Lahuraka et al. | |
| 2014/0064996 A1 | 3/2014 | Arima | |
| 2014/0127036 A1 | 5/2014 | Buckley et al. | |
| 2014/0127058 A1 | 5/2014 | Buckley et al. | |
| 2014/0127062 A1 | 5/2014 | Buckley et al. | |
| 2014/0150889 A1 | 6/2014 | Ragner | |
| 2014/0261790 A1 | 9/2014 | Marica | |
| 2014/0312257 A1 | 10/2014 | Marica | |
| 2014/0322050 A1 | 10/2014 | Marette et al. | |
| 2014/0328701 A1 | 11/2014 | Nathan | |
| 2014/0348677 A1 | 11/2014 | Moeller et al. | |
| 2015/0132157 A1 | 5/2015 | Whaley et al. | |
| 2016/0131131 A1 | 5/2016 | Weaver et al. | |
| 2016/0131264 A1 | 5/2016 | Bregazzi et al. | |
| 2016/0215588 A1 | 7/2016 | Belshan et al. | |
| 2016/0281699 A1 | 9/2016 | Gnessin et al. | |
| 2016/0319805 A1 | 11/2016 | Dille | |
| 2017/0023137 A1* | 1/2017 | Braeuer | F16K 1/42 |
| 2018/0058431 A1 | 3/2018 | Blume | |
| 2018/0058444 A1 | 3/2018 | Blume | |
| 2018/0298894 A1 | 10/2018 | Wagner et al. | |
| 2019/0120389 A1 | 4/2019 | Foster et al. | |
| 2019/0145391 A1 | 5/2019 | Davids | |
| 2019/0226475 A1 | 7/2019 | Stark et al. | |
| 2020/0347706 A1 | 11/2020 | Nowell et al. | |

FOREIGN PATENT DOCUMENTS

| | | |
|---|---|---|
| EP | 0580196 A1 | 1/1994 |
| EP | 1103722 A2 | 5/2001 |
| EP | 2383470 A1 | 11/2011 |
| GB | 120622 A | 11/1918 |
| GB | 450645 A | 7/1936 |
| GB | 672173 A | 5/1952 |
| GB | 1226014 A | 3/1971 |
| GB | 1262826 A | 2/1972 |
| JP | 63001012 Y2 | 1/1988 |
| JP | 2002037217 A | 2/2002 |
| JP | 2004257283 A | 9/2004 |
| JP | 4121804 B2 | 7/2008 |
| JP | 2009131747 A | 6/2009 |
| JP | 5107651 B2 | 12/2012 |
| JP | 2020040010 A | 3/2020 |
| WO | 2012099649 A1 | 7/2012 |

OTHER PUBLICATIONS

Acknowledgement receipt and specification for patent application entitled, "Easy Change Pump Plunger," by Justin L. Hurst, et al., filed May 14, 2019 as U.S. Appl. No. 16/411,894.

Acknowledgement receipt and specification for patent application entitled, "Flexible Manifold for Reciprocating Pump," by Joseph A. Beisel, et al., filed May 14, 2019 as U.S. Appl. No. 16/411,901.

Acknowledgement receipt and specification for patent application entitled, "Valve Assembly for a Fluid End with Limited Access," by Justin L. Hurst, et al., filed May 14, 2019 as U.S. Appl. No. 16/411,910.

Acknowledgement receipt and specification for patent application entitled, "Pump Plunger with Wrench Features," by Justin L. Hurst, et al., filed May 14, 2019 as U.S. Appl. No. 16/411,905.

Acknowledgement receipt and specification for patent application entitled, "Pump Fluid End with Positional Indifference for Maintenance," by Justin L. Hurst, et al., filed May 14, 2019 as U.S. Appl. No. 16/411,911.

Foreign Communication from Related Application—International Search Report and Written Opinion of the International Searching Authority, International Application No. PCT/US2020/016393, dated May 29, 2020, 13 pages.

Filing Receipt and Specification for patent application entitled "Flexible Manifold for Reciprocating Pump," by Joseph A. Beisel, et al., filed Oct. 7, 2019 as U.S. Appl. No. 16/594,825.

Office Action (Restriction Requirement) dated Aug. 28, 2019, (7 pages), U.S. Appl. No. 16/522,874, filed Jul. 26, 2019.

Office Action (Restriction Requirement) dated Aug. 30, 2019, (5 pages), U.S. Appl. No. 16/436,356, filed Jun. 10, 2019.

Office Action dated Oct. 22, 2019 (27 pages), U.S. Appl. No. 16/522,874, filed Jul. 26, 2019.

Office Action dated Oct. 31, 2019 (21 pages), U.S. Appl. No. 16/436,356, filed Jun. 10, 2019.

Scully Intellicheck2, Complete Overfill Prevention and Retained Product Monitoring System, 67293 Rev B, Oct. 2013, 2 pages.

Scully Intellicheck2, Complete Overfill Prevention and Retained Product Monitoring System, 67293 Rev B, May 2014, 2 pages.

(56) References Cited

OTHER PUBLICATIONS

Scully Intellicheck3, Complete Overfill Prevention and Retained Product Monitoring System, XXXXX Rev A, Jun. 2016, 2 pages.
Acknowledgement receipt and specification for patent application entitled "Pump Fluid End with Suction Valve Closure Assist," by Justin L. Hurst, et al., filed Jun. 10, 2019 as U.S. Appl. No. 16/436,312.
Acknowledgement receipt and specification for patent application entitled "Multi-Material Frac Valve Poppet," by Jim B. Surjaatmadja, et al., filed Jun. 10, 2019 as U.S. Appl. No. 16/436,356.
Acknowledgement receipt and specification for patent application entitled "Multi-Layer Coating for Plunger and/or Packing Sleeve," by Justin L. Hurst, et al., filed Jun. 10, 2019 as U.S. Appl. No. 16/436,389.
Acknowledgement receipt and specification for International application entitled "Multi-Layer Coating for Plunger and/or Packing Sleeve," by Justin L. Hurst, et al., filed Jun. 12, 2019 as International application No. PCT/US2019/036785.
Acknowledgement receipt and specification for patent application entitled, "Oil Field Pumps with Reduced Maintenance," by Jim B. Surjaatmadja, et al., filed Jul. 26, 2019 as U.S. Appl. No. 16/522,860.
Acknowledgement receipt and specification for patent application entitled, "Fail Safe Suction Hose for Significantly Moving Suction Port," by Jim B. Surjaatmadja, et al., filed Jul. 26, 2019 as U.S. Appl. No. 16/522,874.
Acknowledgement receipt and specification for International application entitled "Oil Field Pumps with Reduced Maintenance," by Jim B. Surjaatmadja, et al., filed Jul. 30, 2019 as International application No. PCT/US2019/044191.
Acknowledgement receipt and specification for International application entitled "Fail Safe Suction Hose for Significantly Moving Suction Port," by Jim B. Surjaatmadja, et al., filed Jul. 30, 2019 as International application No. PCT/US2019/044194.
Foreign Communication from Related Application—International Search Report and Written Opinion of the International Searching Authority, International Application No. PCT/US2020/022043, dated Jul. 3, 2020, 13 pages.
Kiani, Mahdi et al., "Numerical Modeling and Analytical Investigation of Autofrettage Process on the Fluid End Module of Fracture Pumps," Journal of Pressure Vessel Technology, Aug. 2018, pp. 0414031-0414037, vol. 140, ASME.
"Pump Catalog," Cat Pumps, Inc., 2014, 24 pages.
Furuta, Katsunori et al., "Study of the In-Line Pump System for Diesel Engines to Meet Future Emission Regulations," SAE International Congress and Exposition, Feb. 1998, pp. 125-136, Society of Automotive Engineers, Inc.
"550 Series: High Pressure, High Flow Water Jetting," Gardner Denver Water Jetting Systems, Inc., 2009, 4 pages.
Houghton, J.E. et al., "Improved Pump Run Time Using Snow Auto-Rotating Plunger (SARP) Pump," SPE Western Regional Meeting, May 1998, SPE46217, 6 pages, Society of Petroleum Engineers, Inc.
"Improved Double Acting Pump," Scientific American, 1867, pp. 248, vol. 17, No. 16, American Periodicals.
Langewis, Jr., C. et al., "Practical Hydraulics of Positive Displacement Pumps for High-Pressure Waterflood Installations," Journal of Petroleum Technology, Feb. 1971, pp. 173-179, SPE-AIME/ Continental Oil Co.
Petzold, Martin et al., "Visualization and Analysis of the Multiphase Flow in an Electromagnetically Driven Dosing Pump," ASME/ BATH Symposium on Fluid Power & Motion Control, Oct. 2013, FPMC2013-4433, 6 pages, ASME.
Romer, M. C. et al., "Field Trial of a Novel Self-Reciprocating Hydraulic Pump for Deliquification," SPE Production & Operations, 2017, 12 pages, Society of Petroleum Engineers.

\* cited by examiner

PUMP VALVE SEAT WITH SUPPLEMENTAL RETENTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates generally to a method and apparatus for supplying pressurized fluids. More particularly, the present disclosure relates to methods and reciprocating devices for pumping fluids into a wellbore.

BACKGROUND

High-pressure pumps having reciprocating elements such as plungers or pistons are commonly employed in oil and gas production fields for operations such as drilling and well servicing. For instance, one or more reciprocating pumps may be employed to pump fluids into a wellbore in conjunction with activities including fracturing, acidizing, remediation, cementing, and other stimulation or servicing activities. Due to the harsh conditions associated with such activities, many considerations are generally taken into account when designing a pump for use in oil and gas operations. One design consideration may concern ease of maintenance, as reciprocating pumps used in wellbore operations, for example, often encounter high cyclical pressures and various other conditions that can render pump components (e.g., a valve seat housing of a valve assembly) susceptible to wear and result in a need for servicing and maintenance of the pump.

Accordingly, it is desirable to provide a pump valve seat that facilitates seating thereof in a valve seat housing, such as, without limitation, a reciprocating element or a fluid end body, such that installation and/or replacing of such a valve seat in the valve seat housing is facilitated.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a reciprocating apparatus for pumping pressurized fluid. In embodiments, the reciprocating apparatus comprises a valve seat comprising a primary retention component to retain the valve seat in a valve seat housing upon seating of the valve seat in the valve seat housing, and a secondary retention component to at least temporarily retain the valve seat in the valve seat housing during seating of the valve seat in the valve seat housing, whereafter the valve seat is primarily retained in the valve seat housing via the primary retention component. The secondary retention component can retain the valve seat in the valve seat housing during seating of the valve seat, such that unintentional "pump out" of the valve seat before the valve seat is fully seated is prevented. As utilized herein, "pump out" indicates a condition where fluid flow through the valve seat creates a delta pressure with sufficient force to dislodge the valve seat from the valve seat housing. In embodiments, the reciprocating apparatus is a high-pressure pump configured to operate at a pressure greater than or equal to about 3,000 psi and/or in a well servicing operation and environment.

Figure 1:
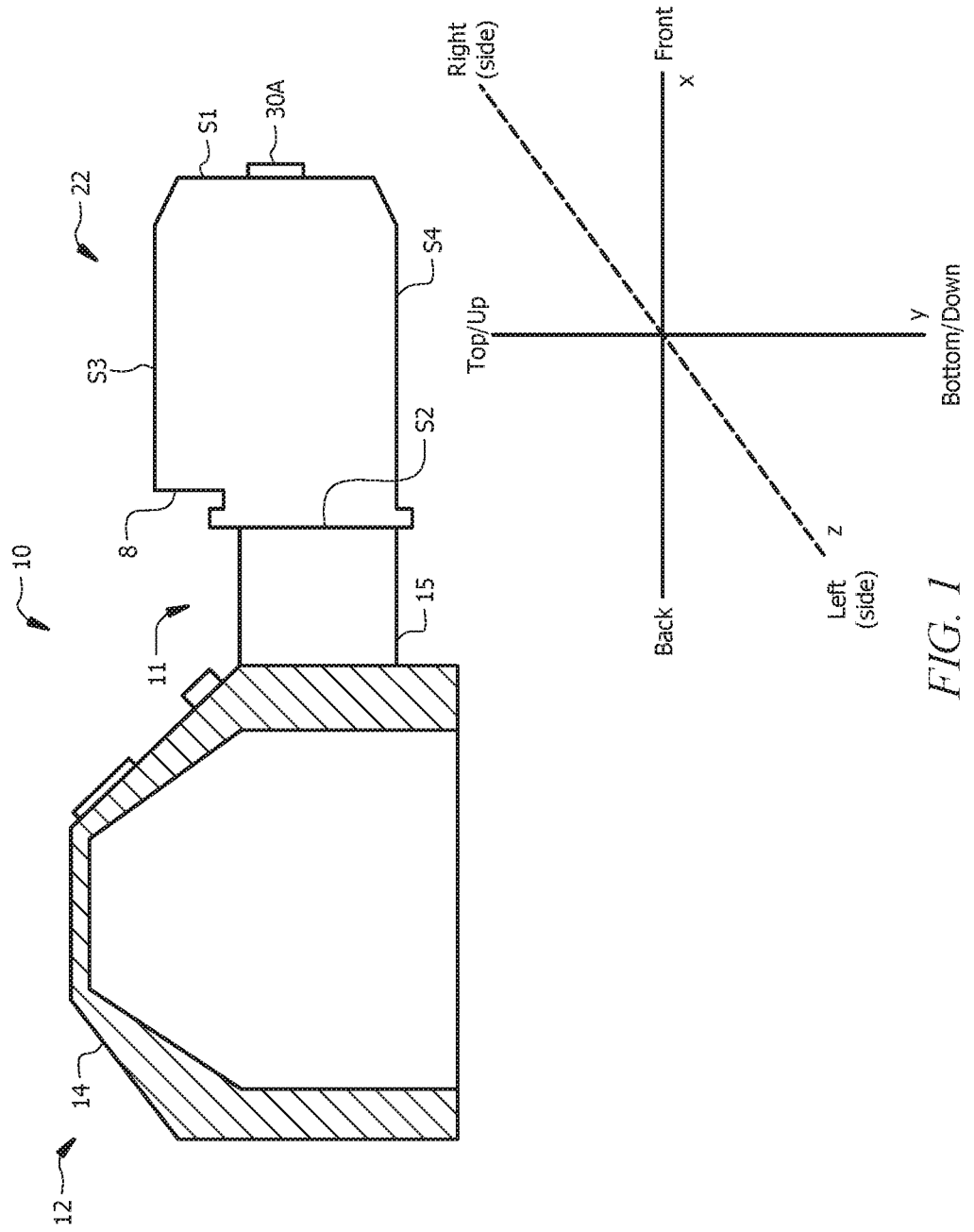
FIG. 1 is an elevational view of a reciprocating pump, according to embodiments of this disclosure.

A reciprocating apparatus of this disclosure may comprise any suitable pump operable to pump fluid. Non-limiting examples of suitable pumps include, but are not limited to, piston pumps, plunger pumps, and the like. In embodiments, the pump is a rotary- or reciprocating-type pump such as a positive displacement pump operable to displace pressurized fluid. The pump comprises a pump power end, a pump fluid end, and an integration section whereby a reciprocating element (e.g., a plunger) can be mechanically connected with the pump power end such that the reciprocating element can be reciprocated within a reciprocating element bore of the pump fluid end. FIG. 1 is an elevational view (e.g., side view) of a pump 10 (e.g., a reciprocating pump) according to an exemplary embodiment, the reciprocating pump comprising a pump power end 12, a pump fluid end 22, and an integration section 11. As illustrated in FIG. 1, pump fluid end has a front S1 opposite a back S2 along a first or x-axis, a top S3 opposite a bottom S4 along a second or y-axis, wherein the y-axis is in the same plane as and perpendicular to the x-axis, and a left side and a right side along a z-axis, wherein the x-axis is along a plane perpendicular to the plane of the x-axis and the y-axis. Accordingly, toward the top of pump fluid end 22 (and pump 10) is along the y-axis toward top S3, toward the bottom of pump fluid end 22 (and pump 10) is along the y-axis toward bottom S4, toward the front of pump fluid end 22 (and pump 10) is along the x-axis toward front S1, and toward the back of pump fluid end 22 (and pump 10) is along the x-axis away from front S1.

Figure 2:
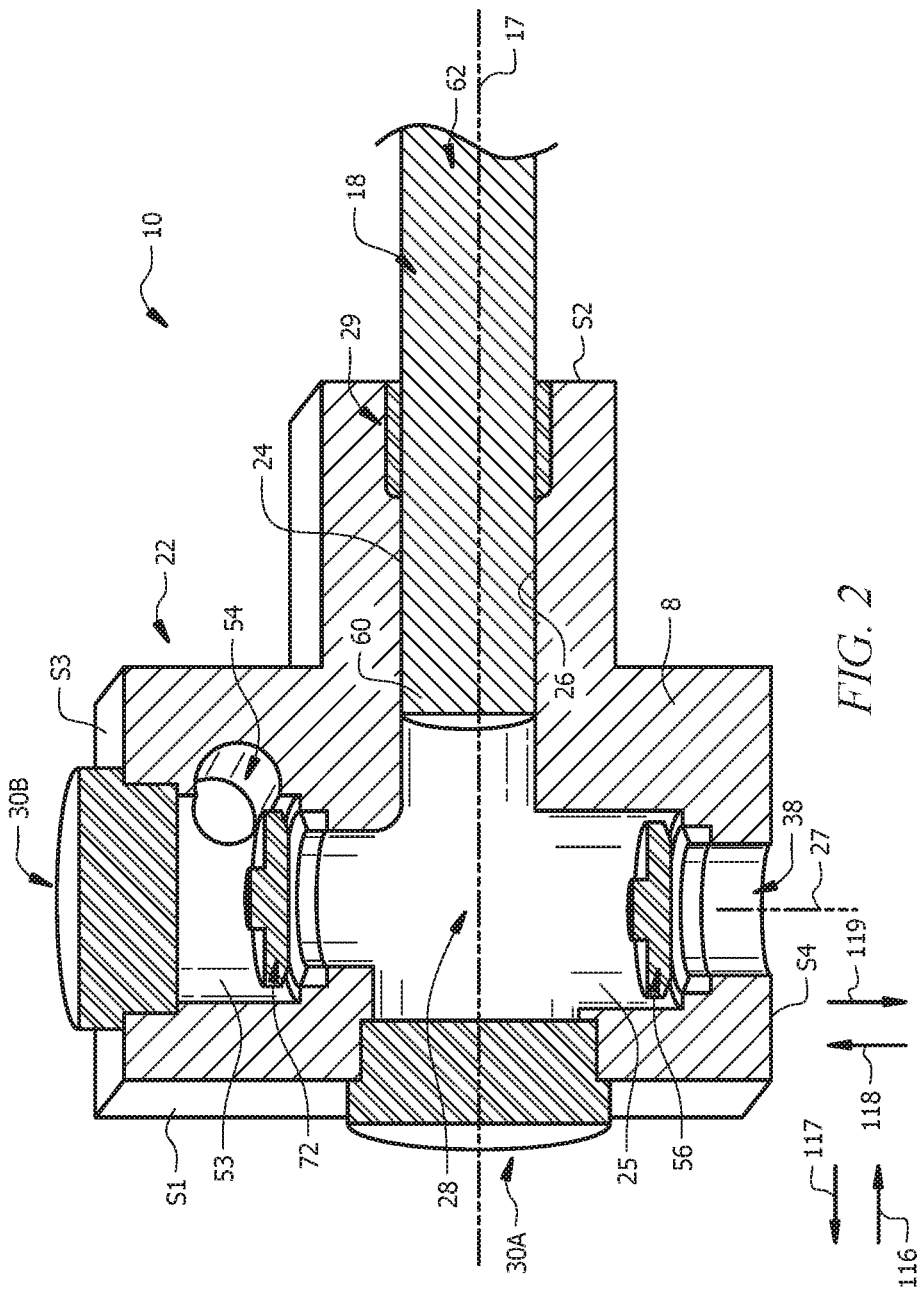
FIG. 2 is a cut-away illustration of an exemplary reciprocating pump comprising a cross-bore pump fluid end, according to embodiments of this disclosure.
Figure 3:
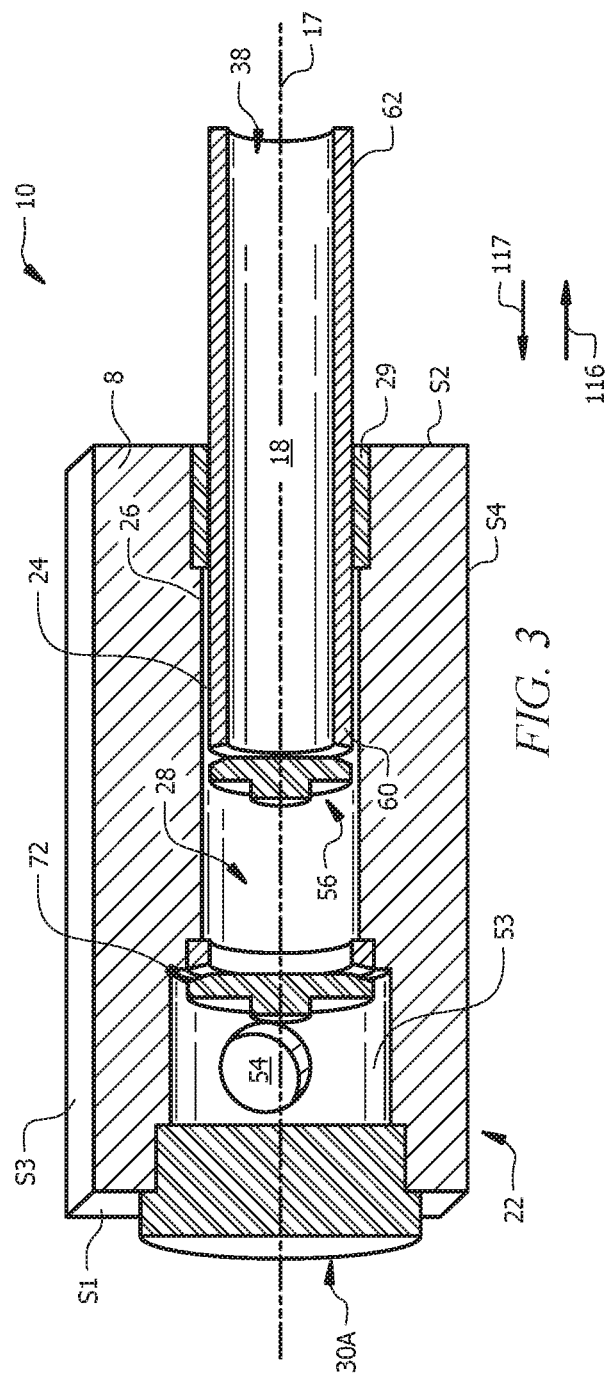
FIG. 3 is a cut-away illustration of an exemplary reciprocating pump comprising a concentric bore pump fluid end, according to embodiments of this disclosure.

The pump fluid end 22 is integrated with the pump power end 12 via the integration section 11, such that pump power end 12 is operable to reciprocate the reciprocating element 18 within a reciprocating element bore 24 (FIGS. 2-3) of the pump fluid end 22. The reciprocating element bore 24 is at least partially defined by a cylinder wall 26. As described further hereinbelow with reference to FIG. 2 and FIG. 3, pump fluid end 22 can be a cross-bore pump fluid end 22 or, alternatively, an in-line or "concentric" bore pump fluid end. As utilized herein, cross-bore pump fluid ends can comprise "T-bore" pump fluid ends, "X-bore" (e.g., cross shaped bore) pump fluid ends, or "Y-bore" pump fluid ends. FIG. 2 is a schematic showing a cross-bore pump fluid end 22 engaged with a reciprocating element 18 and FIG. 3 is a schematic showing a concentric bore pump fluid end 22 engaged with a reciprocating element 18. As discussed further below, the pump 10 includes at least one fluid inlet 38 for receiving fluid from a fluid source, e.g., a suction line, suction header, storage or mix tank, blender, discharge from a boost pump such as a centrifugal pump, etc. The pump 10 also includes at least one discharge outlet 54 for discharging fluid to a discharge source, e.g., a flowmeter, pressure monitoring and control system, distribution header, discharge line, wellhead, discharge manifold pipe, and the like.

The pump 10 may comprise any suitable pump power end 12 for enabling the pump 10 to perform pumping operations (e.g., pumping a wellbore servicing fluid downhole). Similarly, the pump 10 may include any suitable housing 14 for containing and/or supporting the pump power end 12 and components thereof. The housing 14 may comprise various combinations of inlets, outlets, channels, and the like for circulating and/or transferring fluid. Additionally, the housing 14 may include connections to other components and/or systems, such as, but not limited to, pipes, tanks, drive mechanisms, etc. Furthermore, the housing 14 may be configured with cover plates or entryways for permitting access to the pump power end 12 and/or other pump components. As such, the pump 10 may be inspected to determine whether parts need to be repaired or replaced. The pump power end may also be hydraulically driven, whether it is a non-intensifying or an intensifying system.

Figure 4:
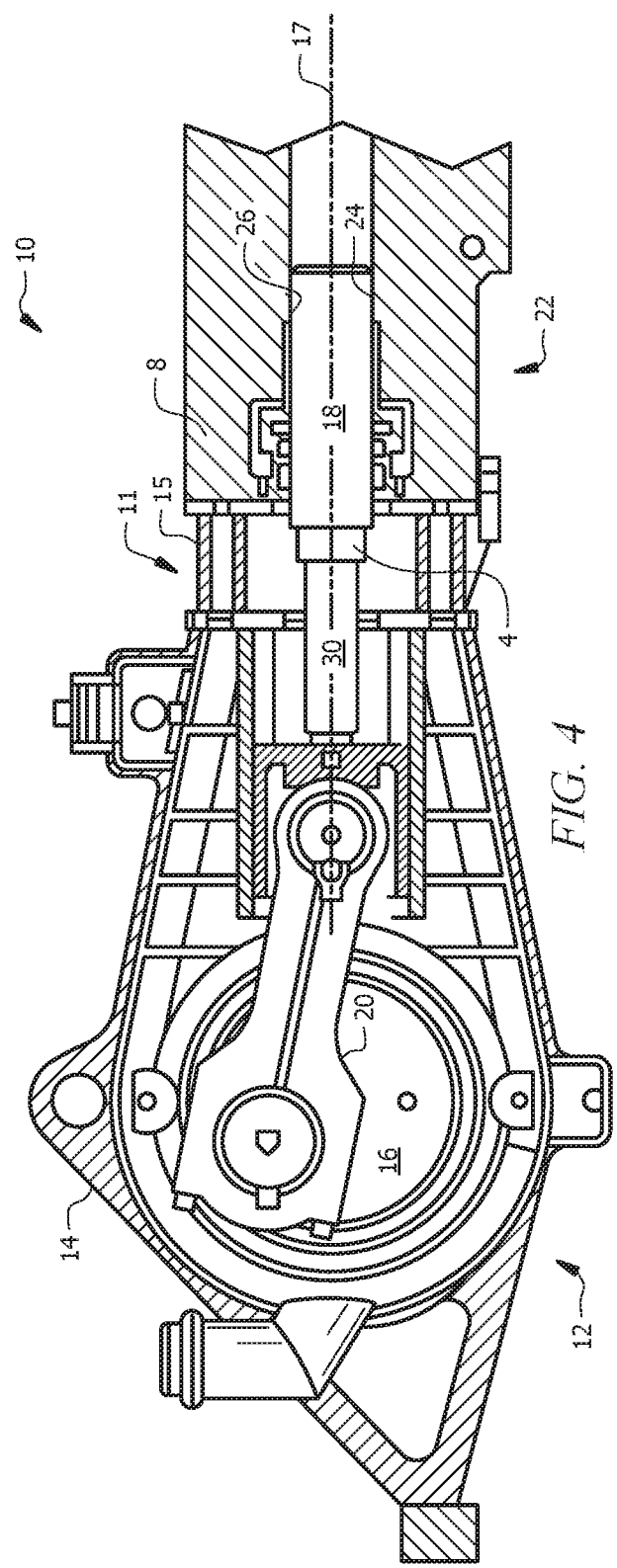
FIG. 4 is cut-away illustration of a pump power end of a pump, according to embodiments of this disclosure.

Those versed in the art will understand that the pump power end 12 may include various components commonly employed in pumps. Pump power end 12 can be any suitable pump known in the art and with the help of this disclosure to be operable to reciprocate reciprocating element 18 in reciprocating element bore 24. For example, without limitation, pump power end 12 can be operable via and comprise a crank and slider mechanism, a powered hydraulic/pneumatic/steam cylinder mechanism or various electric, mechanical or electro-mechanical drives. FIG. 4 provides a cutaway illustration of an exemplary pump 10 of this disclosure, showing an exemplary pump power end 12, integrated via integration section 11 with a pump fluid end 22, wherein the pump power end 12 is operable to reciprocate the reciprocating element 18 within a reciprocating element bore 24 of the pump fluid end 22. Briefly, for example, the pump power end 12 may include a rotatable crankshaft 16 attached to at least one reciprocating element 18 (e.g., a plunger or piston) by way of a crank arm/connecting rod 20. Additionally, an engine (e.g., a diesel engine), motor, or other suitable power source may be operatively connected to the crankshaft 16 (e.g., through a transmission and drive shaft) and operable to actuate rotation thereof. In operation, rotation of the crankshaft 16 induces translational movement of the crank arm/connecting rod 20, thereby causing the reciprocating element 18 to extend and retract along a flow path, which may generally be defined by a central axis 17 within a reciprocating element bore 24 (sometimes referred to herein for brevity as a "reciprocating element bore 24" or simply a "bore 24", although not wishing to be limited to a particular reciprocating element 18). Pump 10 of FIG. 1 is typically mounted on a movable structure such as a semi-tractor trailer or skid, and the moveable structure may contain additional components, such as a motor or engine (e.g., a diesel engine), that provides power (e.g., mechanical motion) to the pump power end 12 (e.g., a crankcase comprising crankshaft 16 and related connecting rods 20).

Of course, numerous other components associated with the pump power end 12 of the pump 10 may be similarly employed, and therefore, fall within the purview of the present disclosure. Furthermore, since the construction and operation of components associated with pumps of the sort depicted in FIG. 1 are well known and understood, discussion of the pump 10 will herein be limited to the extent necessary for enabling a proper understanding of the disclosed embodiments.

As noted hereinabove, the pump 10 comprises a pump fluid end 22 attached to the pump power end 12. Various embodiments of the pump fluid end 22 are described in detail below in connection with other drawings, for example FIGS. 2 and 3. Generally, the pump fluid end 22 comprises at least one fluid inlet 38 for receiving fluid, and at least one discharge outlet 54 through which fluid flows out of the discharge chamber 53. The pump fluid end 22 also comprises at least one valve assembly for controlling the receipt and output of fluid. For example, the pump fluid end 22 can comprise a suction valve assembly 56 and a discharge valve assembly 72. The pump fluid end 22 may include any suitable component(s) and/or structure(s) for containing and/or supporting the reciprocating element 18 and providing a cylinder wall 26 at least partially defining a reciprocating element bore 24 along which the pump power end can reciprocate the reciprocating element during operation of the pump.

In embodiments, the pump fluid end 22 may comprise a cylinder wall 26 at least partially defining a bore 24 through which the reciprocating element 18 may extend and retract. Additionally, the bore 24 may be in fluid communication with a discharge chamber 53 formed within the pump fluid end 22. Such a discharge chamber 53, for example, may be configured as a pressurized discharge chamber 53 having a discharge outlet 54 through which fluid is discharged by the reciprocating element 18. Thus, the reciprocating element 18 may be movably disposed within the reciprocating element bore 24, which may provide a fluid flow path into and/or out of the pump chamber. During operation of the pump 10, the reciprocating element 18 may be configured to reciprocate along a path (e.g., along central axis 17 within bore 24 and/or pump chamber 28, which corresponds to reciprocal movement parallel to the x-axis of FIG. 1) to transfer a supply of fluid to the pump chamber 28 and/or discharge fluid from the pump chamber 28.

In operation, the reciprocating element 18 extends and retracts along a flow path to alternate between providing forward strokes (also referred to as discharge strokes and correlating to movement in a positive direction parallel to the x-axis of FIG. 1) and return strokes (also referred to as suction strokes and correlating to movement in a negative direction parallel to the x-axis of FIG. 1), respectively. During a forward stroke, the reciprocating element 18 extends away from the pump power end 12 and toward the pump fluid end 22. Before the forward stoke begins, the reciprocating element 18 is in a fully retracted position (also referred to as bottom dead center (BDC) with reference to the crankshaft 16), in which case the suction valve assembly 56 can be in a closed configuration having allowed fluid to flow into the (e.g., high pressure) pump chamber 28. (As utilized here, "high pressure" indicates possible subjection to high pressure during discharge.) When discharge valve assembly 72 is in a closed configuration (e.g., under the influence of a closing mechanism, such as a spring), the high pressure in a discharge pipe or manifold containing discharge outlet 54 prevents fluid flow into discharge chamber 53 and causes pressure in the pump chamber 28 to accumulate upon stroking of the reciprocating element 18. When the reciprocating element 18 begins the forward stroke, the pressure builds inside the pump chamber 28 and acts as an opening force that results in positioning of the discharge valve assembly 72 in an open configuration, while a closing force (e.g., via a closing mechanism, such as a spring and/or pressure increase inside pump chamber 28) urges the suction valve assembly 56 into a closed configuration. When utilized in connection with a valve assembly, 'open' and 'closed' refer, respectively, to a configuration in which fluid can flow through the valve assembly (e.g., can pass between a valve body and a valve seat thereof) and a configuration in which fluid cannot flow through the valve assembly (e.g., cannot pass between a valve body and a valve seat thereof). As the reciprocating element 18 extends forward, fluid within the pump chamber 28 is discharged through the discharge outlet 54.

During a return stroke, the reciprocating element 18 reciprocates or retracts away from the pump fluid end 22 and towards the pump power end 12 of the pump 10. Before the return stroke begins, the reciprocating element 18 is in a fully extended position (also referred to as top dead center (TDC) with reference to the crankshaft 16), in which case the discharge valve assembly 72 can be in a closed configuration having allowed fluid to flow out of the pump chamber 28 and the suction valve assembly 56 is in a closed configuration. When the reciprocating element 18 begins and retracts towards the pump power end 12, the discharge valve assembly 72 assumes a closed configuration, while the suction valve assembly 56 opens. As the reciprocating element 18 moves away from the discharge valve 72 during a return stroke, fluid flows through the suction valve assembly 56 and into the pump chamber 28.

With reference to the embodiment of FIG. 2, which is a schematic showing a cross-bore pump fluid end 22 engaged with a reciprocating element 18, cross-bore pump fluid end 22 comprises a cross-bore fluid end body 8, a cross-bore pump chamber 28, a suction valve assembly 56, and a discharge valve assembly 72. In this cross-bore configuration, suction valve assembly 56 and discharge valve assembly 72 are located in a bore or channel 25 (also referred to herein as a cross bore 25) of pump chamber 28, wherein bore 25 has a central axis 27 that is parallel to the y-axis of FIG. 1 and is perpendicular to bore 24 in which reciprocating element 18 reciprocates during operation. Suction valve assembly 56 and discharge valve assembly 72 are operable to direct fluid flow within the pump 10. When reciprocating element 18 retracts, or moves along central axis 17 in a direction away from the pump chamber 28 and the pump fluid end 22 and toward the pump power end 12 (as indicated by arrow 116), a suction valve of the suction valve assembly 56 opens (e.g., either under natural flow or other biasing means), and a discharge valve of discharge valve assembly 72 will be closed, whereby fluid enters pump chamber 28 via fluid inlet 38. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge outlet 54.

With reference to the embodiment of FIG. 3, which is a schematic showing a concentric pump fluid end 22 engaged with a reciprocating element 18, concentric bore pump fluid end 22 comprises a concentric bore fluid end body 8, a concentric pump chamber 28, a suction valve assembly 56, and a discharge valve assembly 72. In this concentric bore configuration, suction valve assembly 56 and discharge valve assembly 72 are positioned in-line (also referred to as coaxial) with reciprocating element bore 24, i.e., central axis 17 of reciprocating element bore 24 is also the central axis of suction pump assembly 56 and discharge valve assembly 72). Suction valve assembly 56 and discharge valve assembly 72 are operable to direct fluid flow within the pump 10. In some concentric bore fluid end designs, fluid flows within a hollow reciprocating element (e.g., a hollow plunger) 18. In some such embodiments, the reciprocating element bore 24 of such a concentric bore fluid end design can be defined by a high pressure cylinder 26 providing a high pressure chamber and a low pressure cylinder (not depicted in the embodiment of FIG. 3) providing a low pressure chamber toward tail end 62 of reciprocating element 18, whereby fluid from fluid inlet 38 enters reciprocating element 18. When reciprocating element 18 retracts, or moves along central axis 17 in a direction away from the pump chamber 28 and pump fluid end 22 and toward pump power end 12 (as indicated by arrow 116), a suction valve of the suction valve assembly 56 opens (e.g., either under natural flow and/or other biasing means), and a discharge valve of discharge valve assembly 72 will be closed, whereby fluid enters pump chamber 28 via a fluid inlet 38. For a concentric bore pump fluid end 22 design, the fluid inlet can be configured to introduce fluid into pump chamber 28 via a reciprocating element 18 that is hollow and/or via a low pressure chamber as described above. When the reciprocating element 18 reverses direction, due to the action of the pump power end 12, the reciprocating element 18 reverses direction along central axis 17, now moving in a direction toward the pump chamber 28 and pump fluid end 22 and away from pump power end 12 (as indicated by arrow 117), and the discharge valve of discharge valve assembly 72 is open and the suction valve of suction valve assembly 56 is closed (e.g., again either due to fluid flow and/or other biasing means of valve control), such that fluid is pumped out of pump chamber 28 via discharge chamber 53 and discharge outlet 54.

A pump 10 of this disclosure can comprise one or more access ports. For example, with reference to the cross-bore fluid end body 8 embodiment of FIG. 2, a front access port 30A can be located on a front S1 of the pump fluid end 22 opposite a back S2 of the pump fluid end 22, wherein the back S2 of the pump fluid end is proximal the pump power end 12, upon integration therewith via integration section 11. A top access port 30B can be located on a top S3 of the pump fluid end 22 opposite a bottom S4 of the pump fluid end 22, wherein the top S1 of the pump fluid end 22 is above central axis 17 and the bottom S4 of the pump fluid end 22 is below central axis 17. With reference to the concentric fluid end body 8 embodiment of FIG. 3, a front access port 30A can be located on a front S1 of the pump fluid end 22 opposite a back S2 of the pump fluid end 22, wherein the back S2 of the pump fluid end is proximal the pump power end 12, upon integration therewith via integration section 11. Locations described as front S1, back S2, top S3, and bottom S4 are further described with reference to the x-y-z coordinate system shown in FIG. 1 and further can be relative to a surface (e.g., a trailer bed, the ground, a platform, etc.) upon which the pump 10 is located, a bottom S4 of the pump fluid end being proximal the surface (e.g., trailer bed) upon which the pump 10 is located. Generally, due to size and positioning of pump 10, the front S1 and top S3 of the pump fluid end 22 are more easily accessible than a back S2 or bottom S4 thereof. In a similar manner, a front of pump 10 is distal the pump power end 12 and a back of the pump 10 is distal the pump fluid end 22. The integration section 11 can be positioned in a space between the pump fluid end 22 and the pump power end 12, and can be safeguarded (e.g., from personnel) via a cover 15.

In embodiments, a pump fluid end 22 and pump 10 of this disclosure comprise at least one access port located on a side of the discharge valve assembly 72 opposite the suction valve assembly 56. For example, in the cross-bore pump fluid end 22 embodiment of FIG. 2, top access port 30B is located on a side (e.g., top side) of discharge valve assembly 72 opposite suction valve assembly 56, while in the concentric bore pump fluid end 22 embodiment of FIG. 3, front access port 30A is located on a side (e.g., front side) of discharge valve assembly 72 opposite suction valve assembly 56.

In embodiments, one or more seals 29 (e.g., "o-ring" seals, packing seals, or the like), also referred to herein as 'primary' reciprocating element packing 29 may be arranged around the reciprocating element 18 to provide sealing between the outer walls of the reciprocating element 18 and the inner walls 26 defining at least a portion of the reciprocating element bore 24. In some concentric bore fluid end designs, a second set of seals (also referred to herein as 'secondary' reciprocating element packing; not shown in the Figures) may be fixedly arranged around the reciprocating element 18 to provide sealing between the outer walls of the reciprocating element 18 and the inner walls of a low-pressure cylinder that defines the low pressure chamber described hereinabove (e.g., wherein the secondary packing is farther back along the x-axis and delineates a back end of the low pressure chamber that extends from the primary packing 29 to the secondary packing). Skilled artisans will recognize that the seals may comprise any suitable type of seals, and the selection of seals may depend on various factors e.g., fluid, temperature, pressure, etc.

While the foregoing discussion focused on a pump fluid end 22 comprising a single reciprocating element 18 disposed in a single reciprocating element bore 24, it is to be understood that the pump fluid end 22 may include any suitable number of reciprocating elements. As discussed further below, for example, the pump 10 may comprise a plurality of reciprocating elements 18 and associated reciprocating element bores 24 arranged in parallel and spaced apart along the z-axis of FIG. 1 (or another arrangement such as a V block or radial arrangement). In such a multi-bore pump, each reciprocating element bore may be associated with a respective reciprocating element and crank arm, and a single common crankshaft may drive each of the plurality of reciprocating elements and crank arms. Alternatively, a multi-bore pump may include multiple crankshafts, such that each crankshaft may drive a corresponding reciprocating element. Furthermore, the pump 10 may be implemented as any suitable type of multi-bore pump. In a non-limiting example, the pump 10 may comprise a Triplex pump having three reciprocating elements 18 (e.g., plungers or pistons) and associated reciprocating element bores 24, discharge valve assemblies 72 and suction valve assemblies 56, or a Quintuplex pump having five reciprocating elements 18 and five associated reciprocating element bores 24, discharge valve assemblies 72 and suction valve assemblies 56.

Reciprocating element bore 24 can have an inner diameter slightly greater than the outer diameter of the reciprocating element 18, such that the reciprocating element 18 may sufficiently reciprocate within reciprocating element bore 24. In embodiments, the fluid end body 8 of pump fluid end 22 has a pressure rating ranging from about 100 psi to about 3000 psi, or from about 2000 psi to about 10,000 psi, from about 5000 psi to about 30,000 psi, or from about 3000 psi to about 50,000 psi or greater. The fluid end body 8 of pump fluid end 22 may be cast, forged or formed from any suitable materials, e.g., steel, metal alloys, or the like. Those versed in the art will recognize that the type and condition of material(s) suitable for the fluid end body 8 may be selected based on various factors. In a wellbore servicing operation, for example, the selection of a material may depend on flow rates, pressure rates, wellbore service fluid types (e.g., particulate type and/or concentration present in particle laden fluids such as fracturing fluids or drilling fluids, or fluids comprising cryogenic/foams), etc. Moreover, the fluid end body 8 (e.g., cylinder wall 26 defining at least a portion of reciprocating element bore 24 and/or pump chamber 28) may include protective coatings for preventing and/or resisting abrasion, erosion, and/or corrosion.

In embodiments, the cylindrical shape (e.g., providing cylindrical wall(s) 26) of the fluid end body 8 may be pre-stressed in an initial compression. Moreover, a high-pressure cylinder(s) providing the cylindrical shape (e.g., providing cylindrical wall(s) 26) may comprise one or more sleeves (e.g., heat-shrinkable sleeves). Additionally or alternatively, the high-pressure cylinder(s) may comprise one or more composite overwraps and/or concentric sleeves ("over-sleeves"), such that an outer wrap/sleeve pre-loads an inner wrap/sleeve. The overwraps and/or over-sleeves may be non-metallic (e.g., fiber windings) and/or constructed from relatively lightweight materials. Overwraps and/or over-sleeves may be added to increase fatigue strength and overall reinforcement of the components.

The cylinders and cylindrical-shaped components (e.g., providing cylindrical wall 26) associated with the pump fluid end body 8 of pump fluid end 22 may be held in place within the pump 10 using any appropriate technique. For example, components may be assembled and connected, e.g., bolted, welded, etc. Additionally or alternatively, cylinders may be press-fit into openings machined or cast into the pump fluid end 22 or other suitable portion of the pump 10. Such openings may be configured to accept and rigidly hold cylinders (e.g., having cylinder wall(s) 26 at least partially defining reciprocating element bore 24) in place so as to facilitate interaction of the reciprocating element 18 and other components associated with the pump 10.

In embodiments, the reciprocating element 18 comprises a plunger or a piston. While the reciprocating element 18 may be described herein with respect to embodiments comprising a plunger, it is to be understood that the reciprocating element 18 may comprise any suitable component for displacing fluid. In a non-limiting example, the reciprocating element 18 may be a piston. As those versed in the art will readily appreciate, a piston-type pump generally employs sealing elements (e.g., rings, packing, etc.) attached to the piston and movable therewith. In contrast, a plunger-type pump generally employs fixed or static seals (e.g., primary seal or packing 29) through which the plunger moves during each stroke (e.g., suction stroke or discharge stroke).

As skilled artisans will understand, the reciprocating element 18 may include any suitable size and/or shape for extending and retracting along a flow path within the pump fluid end 22. For instance, reciprocating element 18 may comprise a generally cylindrical shape, and may be sized such that the reciprocating element 18 can sufficiently slide against or otherwise interact with the inner cylinder wall 26. In embodiments, one or more additional components or mechanical linkages 4 (FIG. 4; e.g., clamps, adapters, extensions, etc.) may be used to couple the reciprocating element 18 to the pump power end 12 (e.g., to a pushrod 30).

In some embodiments (e.g., cross-bore pump fluid end 22 embodiments such as FIG. 2), the reciprocating element may be substantially solid and/or impermeable (e.g., not hollow). In alternative embodiments (e.g., concentric bore pump fluid end 22 embodiment such as FIG. 3), the reciprocating element 18 comprises a peripheral wall defining a hollow body. Additionally (e.g., concentric bore pump fluid end 22 embodiments such as FIG. 3), a portion of the peripheral wall of reciprocating element 18 may be generally permeable or may include an input through which fluid may enter the hollow body and an output through which fluid may exit the hollow body. Furthermore, while the reciprocating element 18 may, in embodiments, define a substantially hollow interior and include a ported body, a base of the reciprocating element 18 proximal the pump power end, when assembled, may be substantially solid and/or impermeable (e.g., a plunger having both a hollow portion and a solid portion).

The reciprocating element 18 comprises a front or free end 60. In embodiments comprising concentric bore pump fluid end designs 22 such as shown in FIG. 3, the reciprocating element 18 can contain or at least partially contain the suction valve assembly 56. In one aspect, the suction valve assembly 56 is at least partially disposed within the reciprocating element 18 at or proximate to the front end 60 thereof. At an opposite or tail end 62 (also referred to as back or tail end 62) of the reciprocating element 18, the reciprocating element 18 may include a base coupled to the pump power end 12 of the pump 10 (e.g., via crank arm 20). In embodiments, the tail end 62 of the reciprocating element 18 is coupled to the pump power end 12 outside of pump fluid end 22, e.g., within integration section 11.

As noted above, pump fluid end 22 contains a suction valve assembly 56. Suction valve assembly 56 may alternately open or close to permit or prevent fluid flow. Skilled artisans will understand that the suction valve assembly 56 may be of any suitable type or configuration (e.g., gravity- or spring-biased, flow activated, etc.). Those versed in the art will understand that the suction valve assembly 56 may be disposed within the pump fluid end 22 at any suitable location therein. For instance, the suction valve assembly 56 may be disposed within the bore 25 below central axis 17 of the pump fluid end 22, in cross-bore pump fluid end 22 designs such as FIG. 2, such that a suction valve body of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration. The suction valve assembly 56 may be disposed within reciprocating element bore 24 and at least partially within reciprocating element 18 in concentric bore pump fluid end 22 designs such as FIG. 3, such that a suction valve body of the suction valve assembly 56 moves away from a suction valve seat within the a suction valve seat housing of reciprocating element 18 when the suction valve assembly 56 is in an open configuration and toward the suction valve seat when the suction valve assembly 56 is in a closed configuration.

Pump 10 comprises a discharge valve assembly 72 for controlling the output of fluid through discharge chamber 53 and discharge outlet 54. Analogous to the suction valve assembly 56, the discharge valve assembly 72 may alternately open or close to permit or prevent fluid flow. Those versed in the art will understand that the discharge valve assembly 72 may be disposed within the pump chamber at any suitable location therein. For instance, the discharge valve assembly 72 may be disposed within the bore 25 proximal the top S3 of the pump fluid end 22, in cross-bore pump fluid end 22 designs such as FIG. 2, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. The discharge valve assembly 72 may be disposed proximal the front S1 of bore 24 of the pump fluid end 22 (e.g., at least partially within discharge chamber 53 and/or pump chamber 28) in concentric bore pump fluid end 22 designs such as FIG. 3, such that a discharge valve body of the discharge valve assembly 72 moves toward the discharge chamber 53 when the discharge valve assembly 72 is in an open configuration and away from the discharge chamber 53 when the discharge valve assembly 72 is in a closed configuration. In addition, the discharge valve assembly 72 may be co-axially aligned with the suction valve assembly 56 (e.g., along central axis 17 in concentric bore pump fluid end 22 configurations such as FIG. 3 or along central axis 27 of bore 25 perpendicular to central axis 17 in cross-bore pump fluid end 22 configurations such as FIG. 2), and, in concentric bore pump fluid end 22 configurations such as FIG. 3, the suction valve assembly 56 and the discharge valve assembly 72 may be coaxially aligned with the reciprocating element 18 (e.g., along central axis 17).

Further, the suction valve assembly 56 and the discharge valve assembly 72 can comprise any suitable mechanism for opening and closing valves. For example, the suction valve assembly 56 and the discharge valve assembly 72 can comprise a suction valve spring and a discharge valve spring, respectively. Additionally, any suitable structure (e.g., valve assembly comprising sealing rings, stems, poppets, etc.) and/or components may be employed suitable means for retaining the components of the suction valve assembly 56 and the components of the discharge valve assembly 72 within the pump fluid end 22 may be employed.

The fluid inlet 38 may be arranged within any suitable portion of the pump fluid end 22 and configured to supply fluid to the pump in any direction and/or angle. Moreover, the pump fluid end 22 may comprise and/or be coupled to any suitable conduit (e.g., pipe, tubing, or the like) through which a fluid source may supply fluid to the fluid inlet 38. The pump 10 may comprise and/or be coupled to any suitable fluid source for supplying fluid to the pump via the fluid inlet 38. In embodiments, the pump 10 may also comprise and/or be coupled to a pressure source such as a boost pump (e.g., a suction boost pump) fluidly connected to the pump 10 (e.g., via inlet 38) and operable to increase or "boost" the pressure of fluid introduced to pump 10 via fluid inlet 38. A boost pump may comprise any suitable type including, but not limited to, a centrifugal pump, a gear pump, a screw pump, a roller pump, a scroll pump, a piston/plunger pump, or any combination thereof. For instance, the pump 10 may comprise and/or be coupled to a boost pump known to operate efficiently in high-volume operations and/or may allow the pumping rate therefrom to be adjusted. Skilled artisans will readily appreciate that the amount of added pressure may depend and/or vary based on factors such as operating conditions, application requirements, etc. In one aspect, the boost pump may have an outlet pressure greater than or equal to about 70 psi, about 80 psi, or about 110 psi, providing fluid to the suction side of pump 10 at about said pressures. Additionally or alternatively, the boost pump may have a flow rate of greater than or equal to about 80 BPM, about 70 BPM, and/or about 50 BPM.

As noted hereinabove, the pump 10 may be implemented as a multi-cylinder pump comprising multiple cylindrical reciprocating element bores 24 and corresponding components. In embodiments, the pump 10 is a Triplex pump in which the pump fluid end 22 comprises three reciprocating assemblies, each reciprocating assembly comprising a suction valve assembly 56, a discharge valve assembly 72, a pump chamber 28, a fluid inlet 38, a discharge outlet 54, and a reciprocating element bore 24 within which a corresponding reciprocating element 18 reciprocates during operation of the pump 10 via connection therewith to a (e.g., common) pump power end 12. In embodiments, the pump 10 is a Quintuplex pump in which the pump fluid end 22 comprises five reciprocating assemblies. In a non-limiting example, the pump 10 may be a Q10™ Quintuplex Pump or an HT-400™ Triplex Pump, produced by Halliburton Energy Services, Inc.

In embodiments, the pump fluid end 22 may comprise an external manifold (e.g., a suction header) for feeding fluid to the multiple reciprocating assemblies via any suitable inlet(s). Additionally or alternatively, the pump fluid end 22 may comprise separate conduits such as hoses fluidly connected to separate inlets for inputting fluid to each reciprocating assembly. Of course, numerous other variations may be similarly employed, and therefore, fall within the scope of the present disclosure.

Those skilled in the art will understand that the reciprocating elements of each of the reciprocating assemblies may be operatively connected to the pump power end 12 of the pump 10 according to any suitable manner. For instance, separate connectors (e.g., cranks arms/connecting rods 20, one or more additional components or mechanical linkages 4, pushrods 30, etc.) associated with the pump power end 12 may be coupled to each reciprocating element body or tail end 62. The pump 10 may employ a common crankshaft (e.g., crankshaft 16) or separate crankshafts to drive the multiple reciprocating elements.

As previously discussed, the multiple reciprocating elements may receive a supply of fluid from any suitable fluid source, which may be configured to provide a constant fluid supply. Additionally or alternatively, the pressure of supplied fluid may be increased by adding pressure (e.g., boost pressure) as described previously. In embodiments, the fluid inlet(s) 38 receive a supply of pressurized fluid comprising a pressure ranging from about 30 psi to about 300 psi.

Additionally or alternatively, the one or more discharge outlet(s) 54 may be fluidly connected to a common collection point such as a sump or distribution manifold, which may be configured to collect fluids flowing out of the fluid outlet(s) 54, or another cylinder bank and/or one or more additional pumps.

During pumping, the multiple reciprocating elements 18 will perform forward and returns strokes similarly, as described hereinabove. In embodiments, the multiple reciprocating elements 18 can be angularly offset to ensure that no two reciprocating elements are located at the same position along their respective stroke paths (i.e., the plungers are "out of phase"). For example, the reciprocating elements may be angularly distributed to have a certain offset (e.g., 120 degrees of separation in a Triplex pump) to minimize undesirable effects that may result from multiple reciprocating elements of a single pump simultaneously producing pressure pulses. The position of a reciprocating element is generally based on the number of degrees a pump crankshaft (e.g., crankshaft 16) has rotated from a bottom dead center (BDC) position. The BDC position corresponds to the position of a fully retracted reciprocating element at zero velocity, e.g., just prior to a reciprocating element moving (i.e., in a direction indicated by arrow 117 in FIGS. 2 and 3) forward in its cylinder. A top dead center position corresponds to the position of a fully extended reciprocating element at zero velocity, e.g., just prior to a reciprocating element moving backward (i.e., in a direction indicated by arrow 116 in FIGS. 2 and 3) in its cylinder.

As described above, each reciprocating element 18 is operable to draw in fluid during a suction (backward or return) stroke and discharge fluid during a discharge (forward) stroke. Skilled artisans will understand that the multiple reciprocating elements 18 may be angularly offset or phase-shifted to improve fluid intake for each reciprocating element 18. For instance, a phase degree offset (at 360 degrees divided by the number of reciprocating elements) may be employed to ensure the multiple reciprocating elements 18 receive fluid and/or a certain quantity of fluid at all times of operation. In one implementation, the three reciprocating elements 18 of a Triplex pump may be phase-shifted by a 120-degree offset. Accordingly, when one reciprocating element 18 is at its maximum forward stroke position, a second reciprocating element 18 will be 60 degrees through its discharge stroke from BDC, and a third reciprocating element will be 120 degrees through its suction stroke from top dead center (TDC).

Herein disclosed is a valve seat comprising a primary retention component to retain the valve seat in a valve seat housing upon seating of the valve seat in the valve seat housing; and a secondary retention component to at least temporarily retain the valve seat in the valve seat housing during seating of the valve seat in the valve seat housing, whereafter the valve seat is primarily retained in the valve seat housing via the primary retention component. In embodiments, the primary retention component comprises a locking taper outer diameter (OD). The valve seat can comprise a discharge valve seat or a suction valve seat.

As seen in FIGS. 5A-9 (and with reference back to FIGS. 2-3), a valve seat/valve seat housing assembly 50A/50B/50C/50D/50E of this disclosure can comprise a valve seat 68 and a valve seat housing 65. The valve seat housing 65 can comprise part of a reciprocating element 18, for example, when the valve seat 68 is a suction valve seat of a concentric bore pump fluid end 22, wherein the suction valve seat 68 is part of a suction valve assembly 56 coupled with a reciprocating element 18. Alternatively, the valve seat housing 65 can be part of a pump fluid end body 8. The part of the reciprocating element 18 or the part of the pump fluid end body 8 that comprises the valve seat housing 65 can be an integral part of the reciprocating element 18 or the pump fluid end body 8, or, alternatively, can be a part fixed thereto upon pump assembly (e.g., a valve seat adapter whereby the valve seat 68 is coupled with the valve seat housing 65). For example, when the valve seat 68 is a discharge valve seat of a discharge valve assembly 72 of a concentric bore or a cross-bore fluid end 22, the herein disclosed valve seat 68 can be a discharge valve seat of a discharge valve assembly 72 associated with discharge chamber 53. In such embodiments, the discharge valve seat housing 65 of the discharge valve seat can comprise an inside surface of or within (e.g., a valve seat adapter within) pump chamber 28 and/or pump chamber 53. In other embodiments, the valve seat 68 of this disclosure is a suction valve seat of a suction valve assembly 56 of a cross-bore pump fluid end 22. In such embodiments, the suction valve seat housing 65 of the suction valve seat 68 can comprise an inside surface of or within (e.g., a valve seat adapter within) bore 25 of pump chamber 28. Accordingly, a bore 66 of a valve seat housing 65 of this disclosure can comprise reciprocating element bore 24, cross bore 25, a bore of an at least partially hollow reciprocating element 18, a bore of pump chamber 38, or a bore of discharge chamber 53.

The secondary retention component can comprise a groove 70 about an outer circumference of the valve seat 68. As seen in FIGS. 5A-7B and 9, groove 70 can have a bottom 2 and a top 3, wherein the bottom 2 of groove 7 is a side of groove 70 opposite a top 3 of groove 70, and top 3 is a side of groove 70 distal valve seat housing contact surface 67 of valve seat 68. It should be noted that 'top' and 'bottom', when utilized in reference to groove 70 do not necessarily indicate top S3 and bottom S4 as utilized with reference to pump 10 or pump fluid end 22.

As noted hereinabove, in embodiments such as depicted in FIGS. 5A-9, the primary retention component of valve seat 68 comprises a locking taper outer diameter (OD) 61. The groove 70 can be continuous or discontinuous about an outer circumference of the locking taper OD 61. In embodiments, groove 70 is located within about 20, 30, or 40% of a length of locking taper OD 61 from an end of OD 61 proximate valve body contact surface 69. Furthermore, although depicted as having a rectangular cross-section in the embodiments of FIGS. 5A-5B, 7A-7B, and 9 and a hemispherical cross-section in FIGS. 6A-6B, groove 70 can have a cross-section of any shape. As will be described further with reference to the exemplary embodiments of FIGS. 5A-7B and 9, groove 70 is configured such that an insertion component (71A/71B/71C/71D, described further hereinbelow) of the secondary retention component can be inserted at least partially within groove 70, whereby valve seat 68 can be at least temporarily retained in the valve seat housing 65 during seating of the valve seat 68 in the valve seat housing 65. Upon fully seating the valve seat 68 in the valve seat housing 68, the valve seat 68 is retained within the valve seat housing 65, primarily via the primary retention component (e.g., the locking taper OD 61 of valve seat 68).

Figure 5A:
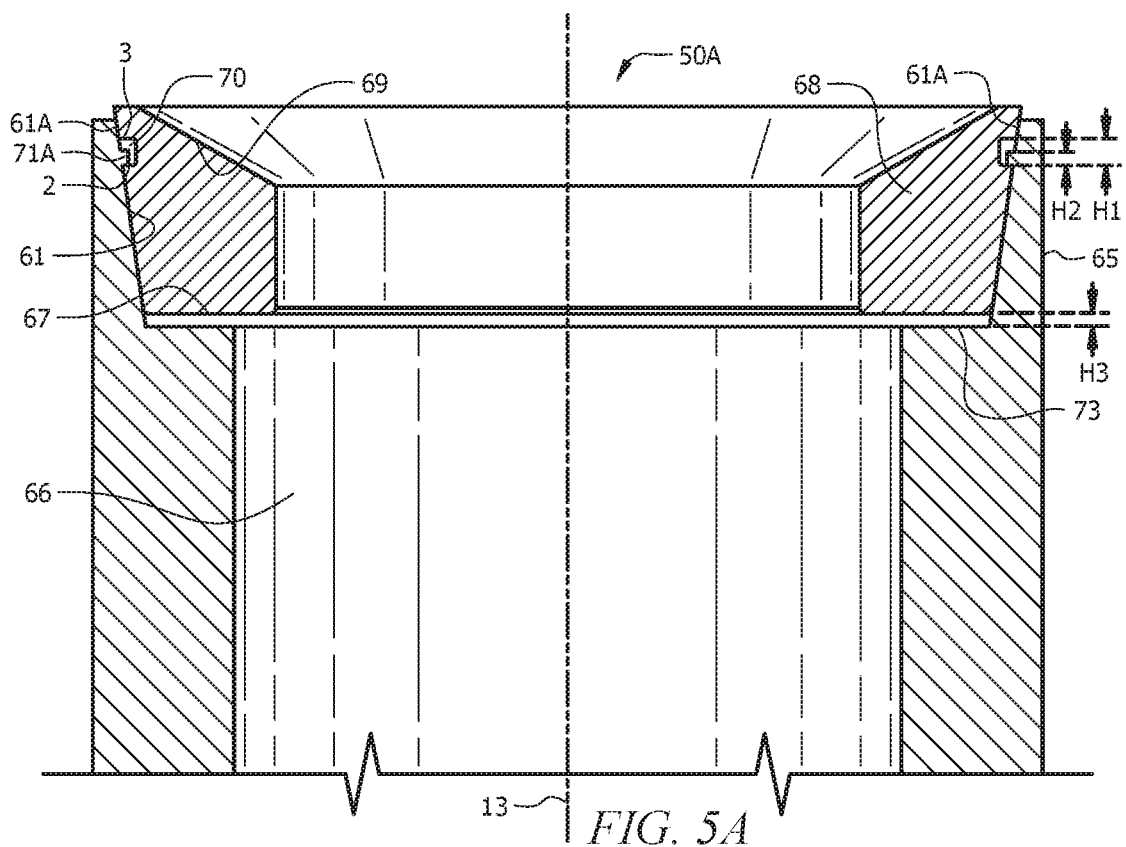
FIG. 5A is a schematic of a valve seat/valve seat housing assembly in an unseated configuration, wherein the valve seat is at least temporarily retained in the valve seat housing via the secondary retention component, prior to fully seating the valve seat in the valve seat housing, according to embodiments of this disclosure.

Prior to fully seating valve seat 68 as shown in FIGS. 5A/6A/7A/8A, a first axial distance H3 along a direction parallel to a central axis 13 can exist between a valve seat housing contact surface 67 of the valve seat 68 (that is located distal a valve body contact surface 69 of valve seat 68) and a valve seat contact surface 73 of the valve seat housing 65 (that is located distal the valve body contact surface 69 of valve seat 68). As utilized herein, "fully seating" valve seat 68 in valve seat housing 65 indicates fully engaging the primary retention feature. Fully seating indicates that valve seat housing contact surface 67 of the valve seat 68 distal the valve body contact surface 69 of valve seat 68 contacts at least a portion of, alternatively contacts substantially all of, alternatively fully contacts all of, the valve seat contact surface 73 of the valve seat housing 65 distal the valve body contact surface 69 of valve seat 68. That is, upon fully seating valve seat 68 in valve seat housing 65, first axial distance H3 can be substantially zero, alternatively less than 0.010 inch (0.25 mm), 0.020 inch (0.51 mm), or 0.030 inch (0.76 mm).

Figure 5B:
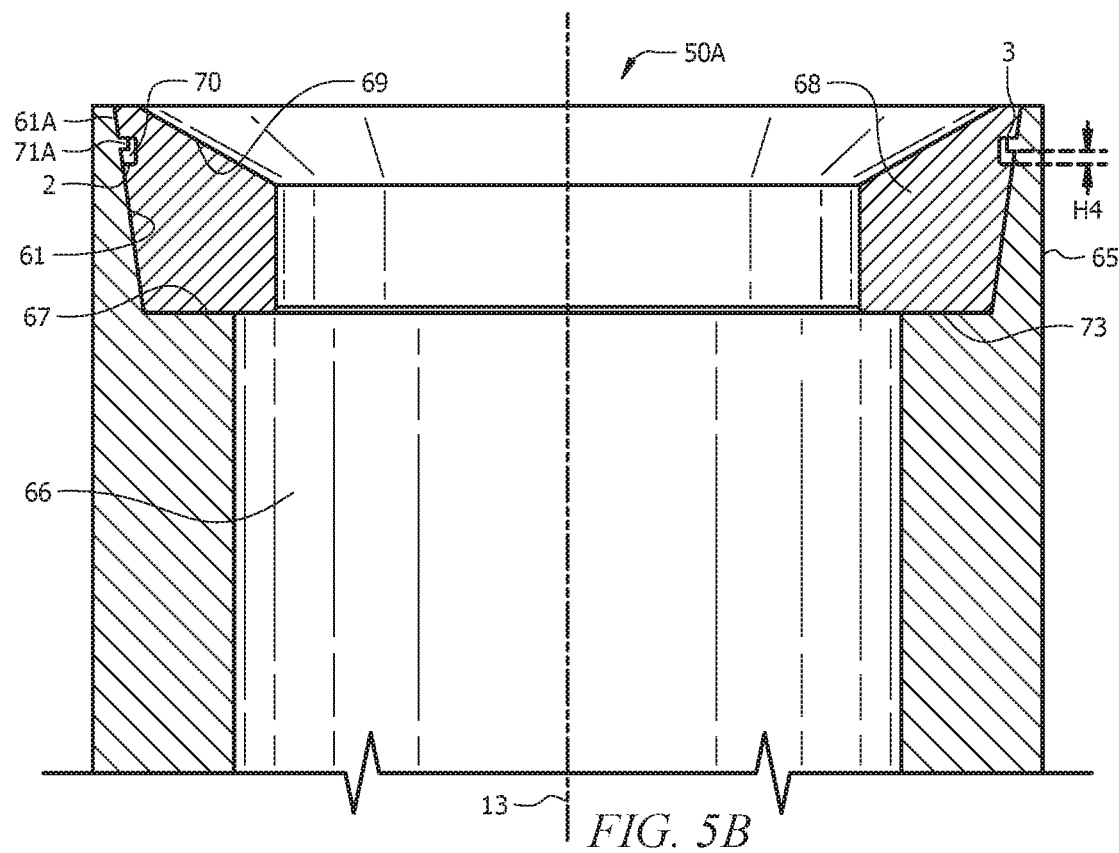
FIG. 5B is a schematic of the valve seat/valve seat housing assembly of FIG. 5A in a fully seated configuration, in which the valve seat is fully seated in the valve seat housing, wherein the valve seat is primarily retained in the valve seat housing via the primary retention component.

Groove 70 can have a height H1 thereof along a direction parallel to a central axis 13 of the valve seat that is greater than a height of the insertion component (e.g., 71A, 71B, and 71C of FIGS. 5A-5B, 6A-6B, and 7A-7B, respectively) along the direction parallel to the central axis of the valve seat (which is also the central axis of valve seat housing 65) when the valve seat 68 is fully seated (also referred to as simply "seated") in the valve seat housing 65, such that the valve seat 68 may move a first axial distance H3 adequate to fully seat the valve seat 68 within the valve seat housing 65 during seating of the valve seat 68 in the valve seat housing 65. Upon (fully) seating of the valve seat 68 in valve seat housing 65, the valve seat 68 is primarily retained in the valve seat housing 65 via the primary retention component, which, in the embodiment of FIG. 5A-7B comprises the locking taper OD 61 of valve seat 68. (As utilized herein, "primarily" retained indicates that the primary retention component provides more than 50, 60, 70, 80, 90, or 100% of the retention of valve seat 68 within valve seat housing 65, when valve seat 68 is fully seated therein.) When fully seated, the primary retention component is fully engaged, and the valve seat 68 is retained in the valve seat housing 65 primarily via the primary retention component. As depicted in FIG. 5B, FIG. 6B, and FIG. 7B, during seating of valve seat 68 in valve seat housing 65, valve seat 68 moves a second axial distance H4 along a direction parallel to central axis 13 equivalent to first axial distance H3, whereby the insertion element (71A/71B/71C) is now positioned within groove 70 toward top 3 thereof and away from bottom 2 thereof a distance equal to first axial distance H3, which also equals second axial distance H4. With reference to FIGS. 5B, 6B, and 7B, upon fully seating valve seat 68 in valve seat housing 65, valve seat contact surface 73 of valve seat housing 65 contacts valve seat housing contact surface 67 of valve seat 68. The valve seat contact surface 73 of valve seat housing 65 is a contact surface distal (e.g., on an opposite side of valve seat 68 from) a valve body contact surface 69 of valve seat 68. Similarly, the valve seat housing contact surface 67 of valve seat 68 is a contact surface distal (e.g., on an opposite side of valve seat 68 from) a valve body contact surface 69 of valve seat 68.

Another contact surface between valve seat 68 and valve seat housing 65 comprises a contact surface between locking taper outside diameter 61 and a correspondingly tapered (e.g., conical) portion 61A of valve seat housing 65. Although depicted in the embodiments of FIGS. 5A-9 such that locking taper OD 61 of valve seat 68 and tapered portion 61A of valve seat housing 65 have a same length along central axis 13 of valve seat 68 when valve seat 68 is fully seated in valve seat housing 65, in embodiments, locking taper OD 61 of valve seat 68 and tapered portion 61A of valve seat housing 65 are of different lengths (for example, and without limitation locking taper OD 61 may have a length less than or greater than tapered portion 61A). Furthermore, although valve seat contact surface 73 and valve seat housing contact surface 67 are depicted in FIGS. 5A-9 as being perpendicular to central axis 13 of valve seat 68 and valve seat housing 65, once valve seat 68 is fully seated in valve seat housing 65, in embodiments, valve seat contact surface 73 and valve seat housing contact surface 67 are not perpendicular to central axis 13.

FIG. 5A is a schematic of a valve seat/valve seat housing 50A, according to embodiments of this disclosure, in an unseated configuration, wherein the valve seat 68 is at least temporarily retained in the valve seat housing 65 via the secondary retention component, prior to fully seating the valve seat 68 in the valve seat housing 65. FIG. 5B is a schematic of the valve seat/valve seat housing 50A assembly of FIG. 5A in a fully seated configuration, in which the valve seat 68 is fully seated in the valve seat housing 65, whereby the valve seat 68 is primarily retained in the valve seat housing 65 via the primary retention component. In the embodiment of FIGS. 5A and 5B, the primary retention component comprises a locking taper OD 61 of the valve seat 68, and the secondary retention component comprises a groove 70 about an outer circumference of valve seat 68 and an insertion component comprising a tab 71A.

Tab 71A can be an integral part of the valve seat housing 65 or of a valve seat adapter associated therewith. In the embodiment of FIG. 5A and FIG. 5B, groove 70 is designed to receive tab 71A of the valve seat housing 65, such that valve seat 68 can be at least temporarily retained in the valve seat housing 65 during seating of the valve seat 68 in the valve seat housing 65 via the secondary retention component comprising groove 70 and tab 71A. In some such embodiments, the valve seat housing 65 comprises tab 71A extending inward toward the central axis 13 and positioned about an inner circumference of valve seat housing 65, and located such that tab 71A can be positioned within the groove 70 of the valve seat 68 during seating of the valve seat in the valve seat housing 65. In some such embodiments, tab 71A extends inward toward the central axis 13 a distance of 0.015 inch (0.381 mm), 0.030 inch (0.762 mm), or 0.045 inch (1.143 mm). In some such embodiments, the valve seat housing 65 comprises tab 71A extending inward toward the central axis 13 and positioned about an inner circumference of tapered portion 61A of valve seat housing 65. Tab 71A can be continuous or discontinuous about the inner circumference of the valve seat housing 65. Accordingly, although referred to as a tab 71A, an insertion element 71A can comprise a plurality of tabs distributed about the inner circumference of valve seat housing 65 and extending inward toward the central axis 13. In embodiments, groove 70 is positioned so that the tab insertion component 71A snaps into the groove 70 just as the tapers of valve seat 68 and valve seat housing 65 first make contact. Groove 70 can be positioned based on a desired inference fit and taper angle, such as, for example, interference fit/tan(theta).

Figure 6A:
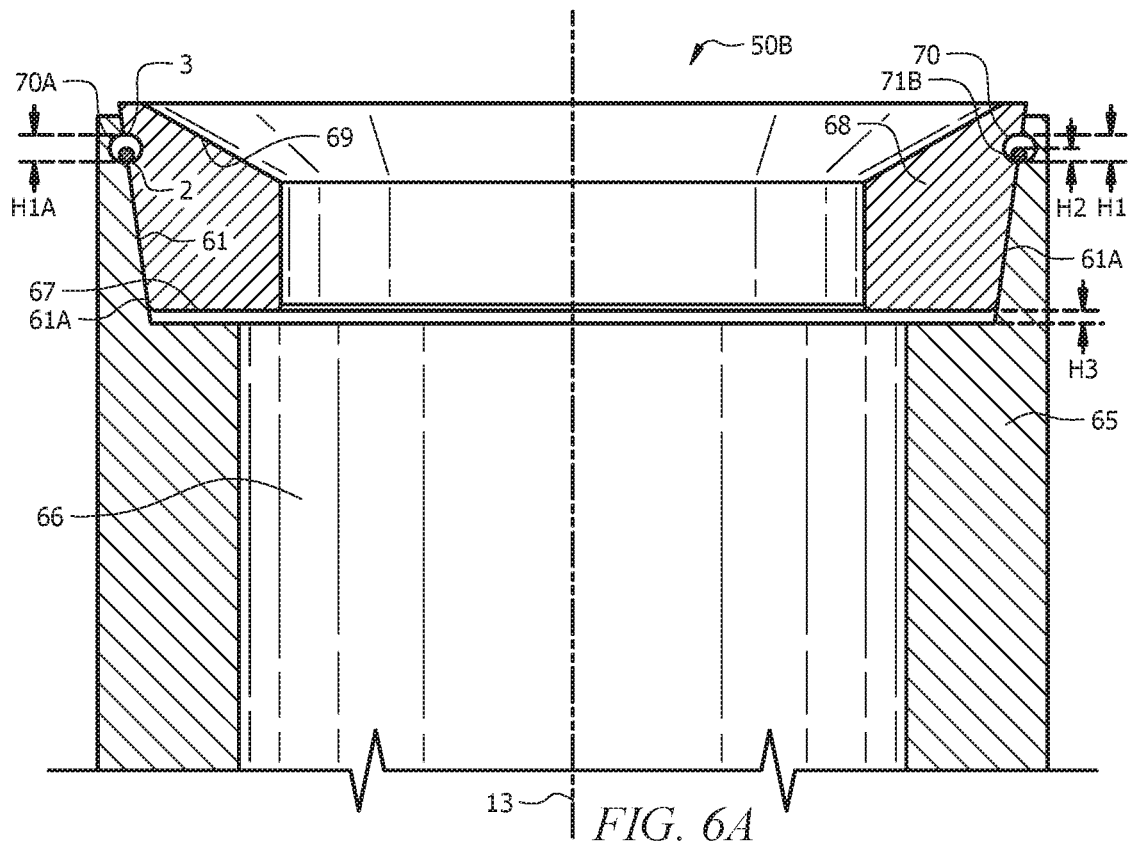
FIG. 6A is a schematic of a valve seat/valve seat housing assembly in an unseated configuration, wherein the valve seat is at least temporarily retained in the valve seat housing via the secondary retention component, prior to fully seating the valve seat in the valve seat housing, according to other embodiments of this disclosure.
Figure 6B:
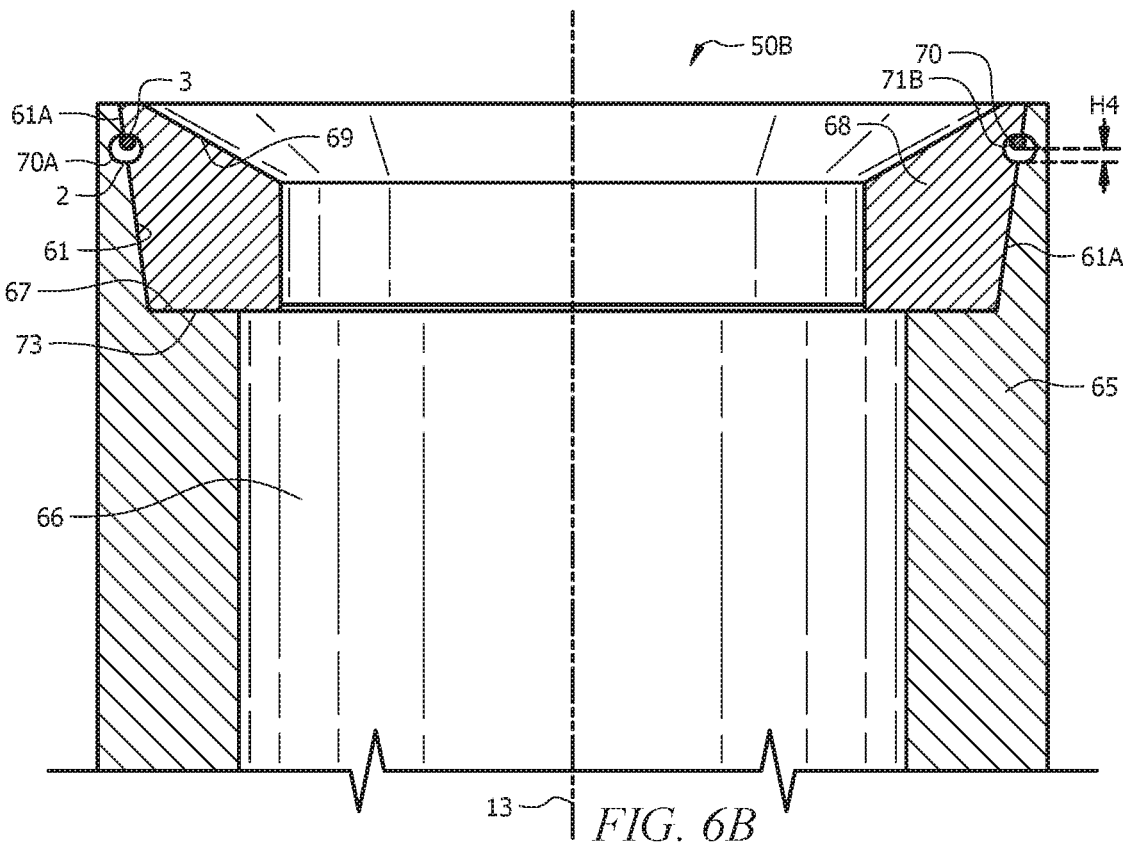
FIG. 6B is a schematic of the valve seat/valve seat housing assembly of FIG. 6A in a fully seated configuration, in which the valve seat is fully seated in the valve seat housing, wherein the valve seat is primarily retained in the valve seat housing via the primary retention component.

FIG. 6A is a schematic of a valve seat/valve seat housing assembly 50B, according to other embodiments of this disclosure, in an unseated configuration, wherein the valve seat 68 is at least temporarily retained in the valve seat housing 65 via the secondary retention component, prior to fully seating the valve seat 68 in the valve seat housing 65. FIG. 6B is a schematic of the valve seat/valve seat housing assembly 50B of FIG. 6A in a fully seated configuration, in which the valve seat 68 is fully seated in the valve seat housing 65, wherein the valve seat 68 is primarily retained in the valve seat housing 65 via the primary retention component. In the embodiment of FIGS. 6A and 6B, the primary retention component comprises a locking taper OD 61 of the valve seat 68, and the secondary retention component comprises a groove 70 about an outer circumference of valve seat 68 and an insertion component comprising a ring 71B.

In embodiments, ring 71B comprises a separate ring (e.g., not an integral piece of valve seat housing 65) that can be positioned within groove 70 during seating of valve seat 68 in valve seat housing 65. For example, ring 71B can comprise a snap ring, an O-ring, a retaining ring, or a combination thereof. The ring insertion element 71B can perform the same function as the tab insertion element 71A in the embodiment of FIGS. 5A and 5B. Ring insertion element 71B can compress into groove 70 in valve seat 68 during installation, and expand and bridge between groove 70 in valve seat 68 and a corresponding groove 70A in valve seat housing 65 during initial seating.

In the embodiment of FIG. 6A and FIG. 6B, the groove 70 is designed to receive at least a portion of ring 71B, such that valve seat 68 can be at least temporarily retained in the valve seat housing 65 during seating of the valve seat 68 in the valve seat housing 65 via the secondary retention component comprising groove 70 and ring 71B.

In such embodiments, groove 70 can be is continuous about the outer circumference of the locking taper OD 61, such that ring 71B (e.g., a snap ring) can be positioned in the groove 70 between the valve seat housing 65 and the valve seat 68. In embodiments, valve seat housing 65 further comprises a corresponding groove 70A, such that ring 71B can partially extend into corresponding groove 70A, whereby ring insertion element 71B bridges between groove 70 and corresponding groove 70A.

Figure 7A:
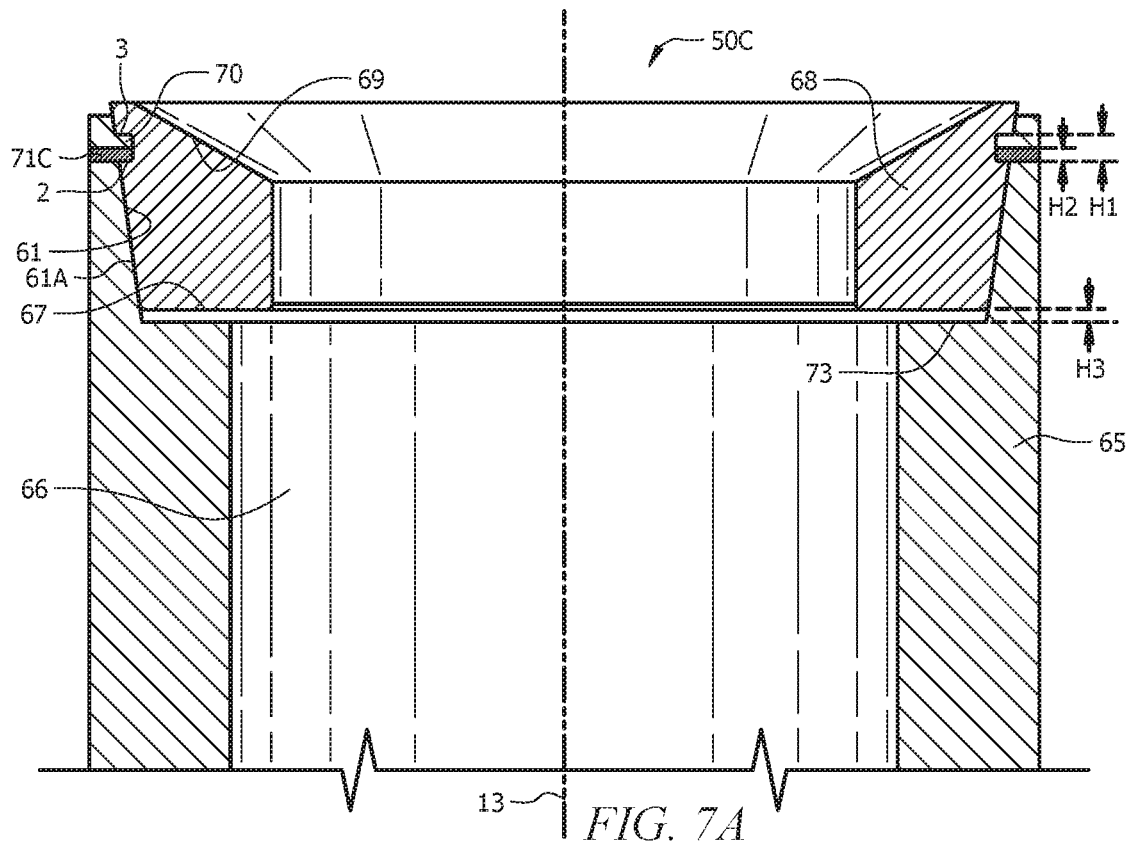
FIG. 7A is a schematic of a valve seat/valve seat housing assembly in an unseated configuration, wherein the valve seat is at least temporarily retained in the valve seat housing via the secondary retention component, prior to fully seating the valve seat in the valve seat housing, according to other embodiments of this disclosure.
Figure 7B:
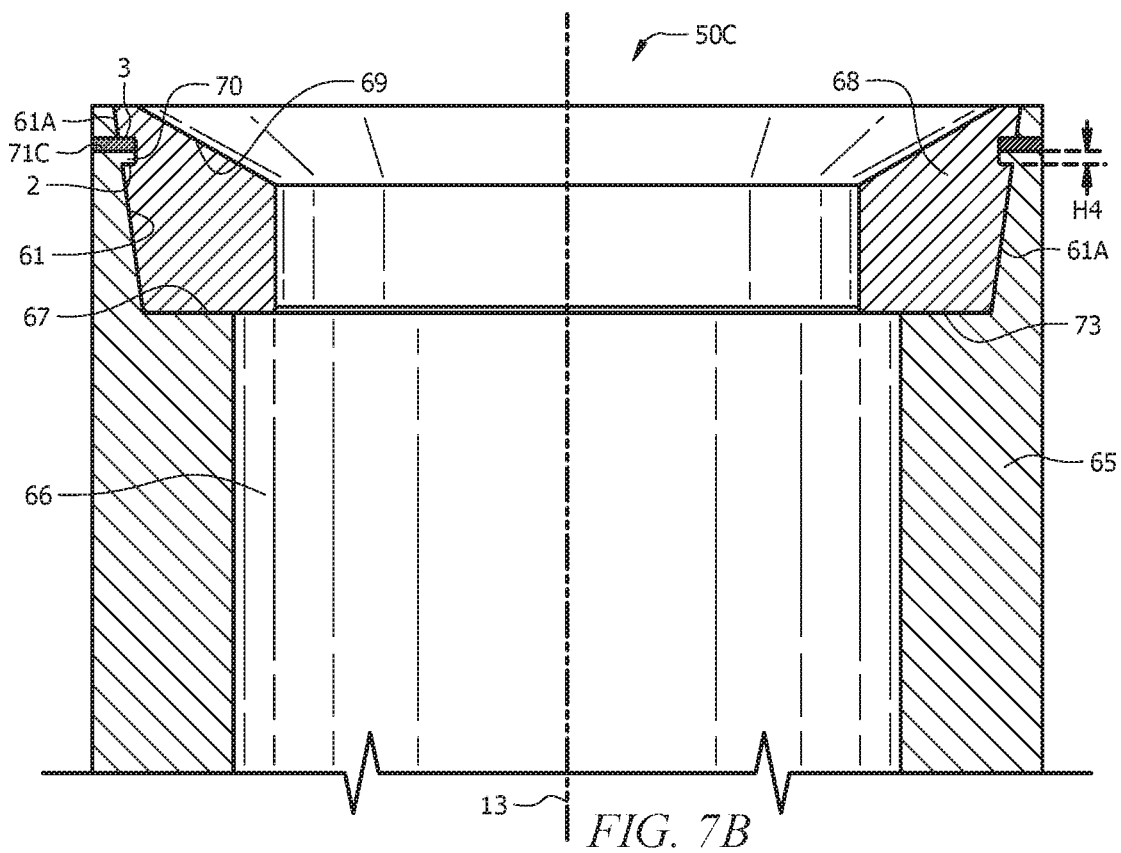
FIG. 7B is a schematic of the valve seat/valve seat housing assembly of FIG. 7A in a fully seated configuration, in which the valve seat is fully seated in the valve seat housing, wherein the valve seat is primarily retained in the valve seat housing via the primary retention component.

FIG. 7A is a schematic of a valve seat/valve seat housing assembly 50C, according to embodiments of this disclosure, in an unseated configuration, wherein the valve seat 68 is at least temporarily retained in the valve seat housing 65 via the secondary retention component, prior to fully seating the valve seat 68 in the valve seat housing 65. FIG. 7B is a schematic of the valve seat/valve seat housing assembly 50C of FIG. 7A in a fully seated configuration, in which the valve seat 68 is fully seated in the valve seat housing 65, whereby the valve seat 68 is primarily retained in the valve seat housing 65 via the primary retention component. In the embodiment of FIGS. 7A and 7B, the primary retention component comprises a locking taper OD 61 of the valve seat 68, and the secondary retention component comprises a groove 70 about an outer circumference of valve seat 68 and an insertion component comprising a pin 71C.

In embodiments, pin 71C can be inserted through valve seat housing 65, and into groove 70. In embodiments, pin 71C has a diameter that is about 25, 50, or 75% of the height H1 of groove 70. In the embodiment of FIG. 7A and FIG. 7B, the groove 70 is designed to receive a portion of pin 71C, such that valve seat 68 can be at least temporarily retained in the valve seat housing 65 during seating of the valve seat 68 in the valve seat housing 65 via the secondary retention component comprising groove 70 and pin 71C. Pin 71C can comprise, for example, a roll pin, a screw, a dowel pin, a rivet, a threaded fastener, or the like. Valve seat 68 can be initially installed into valve seat housing 65, and the pin insertion element 71C pressed into groove 70 from the OD of valve seat housing 65.

Figure 8A:
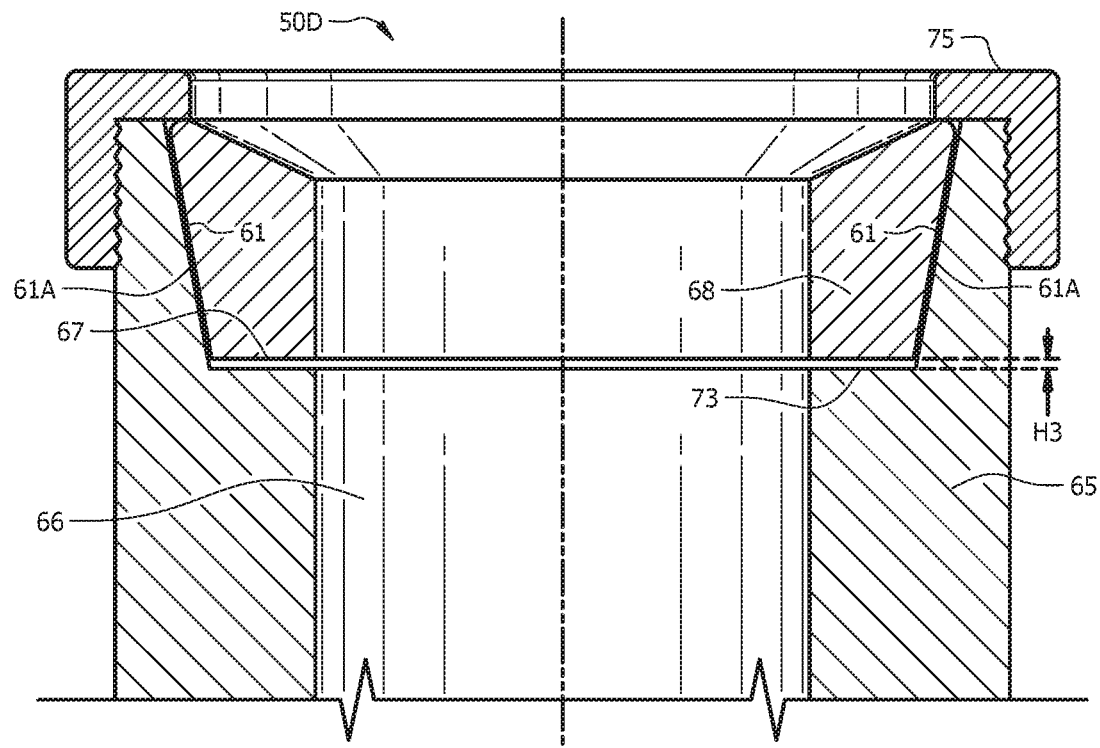
FIG. 8A is a schematic of a valve seat/valve seat housing assembly in an unseated configuration, wherein the valve seat is at least temporarily retained in the valve seat housing via the secondary retention component, prior to fully seating the valve seat in the valve seat housing, according to other embodiments of this disclosure.
Figure 8B:
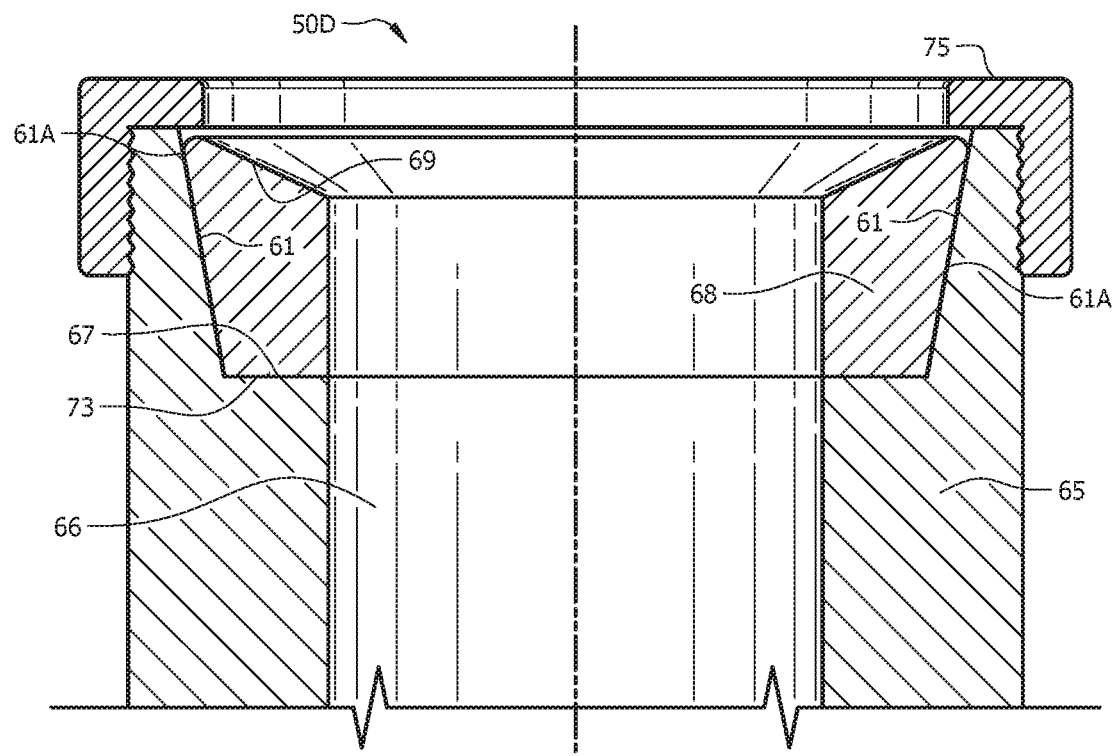
FIG. 8B is a schematic of the valve seat/valve seat housing assembly of FIG. 8A in a fully seated configuration, in which the valve seat is fully seated in the valve seat housing, wherein the valve seat is primarily retained in the valve seat housing via the primary retention component.

FIG. 8A is a schematic of a valve seat/valve seat housing assembly 50D, according to embodiments of this disclosure, in an unseated configuration, wherein the valve seat 68 is at least temporarily retained in the valve seat housing 65 via the secondary retention component, prior to fully seating the valve seat 68 in the valve seat housing 65. FIG. 8B is a schematic of the valve seat/valve seat housing assembly 5D of FIG. 9A in a fully seated configuration, in which the valve seat 68 is fully seated in the valve seat housing 65, whereby the valve seat 68 is primarily retained in the valve seat housing 65 via the primary retention component. In the embodiment of FIGS. 8A and 8B, the primary retention component comprises a locking taper OD 61 of the valve seat 68, and the secondary retention component comprises a threaded ring 75 about an outer circumference of valve seat 68 and/or about an outer circumference of a part of valve seat housing 65 that comprises an inside surface that contacts locking taper OD 61 upon fully seating valve seat 68 (e.g., about an outer circumference of correspondingly tapered portion 61A of valve seat housing 65).

Figure 9:
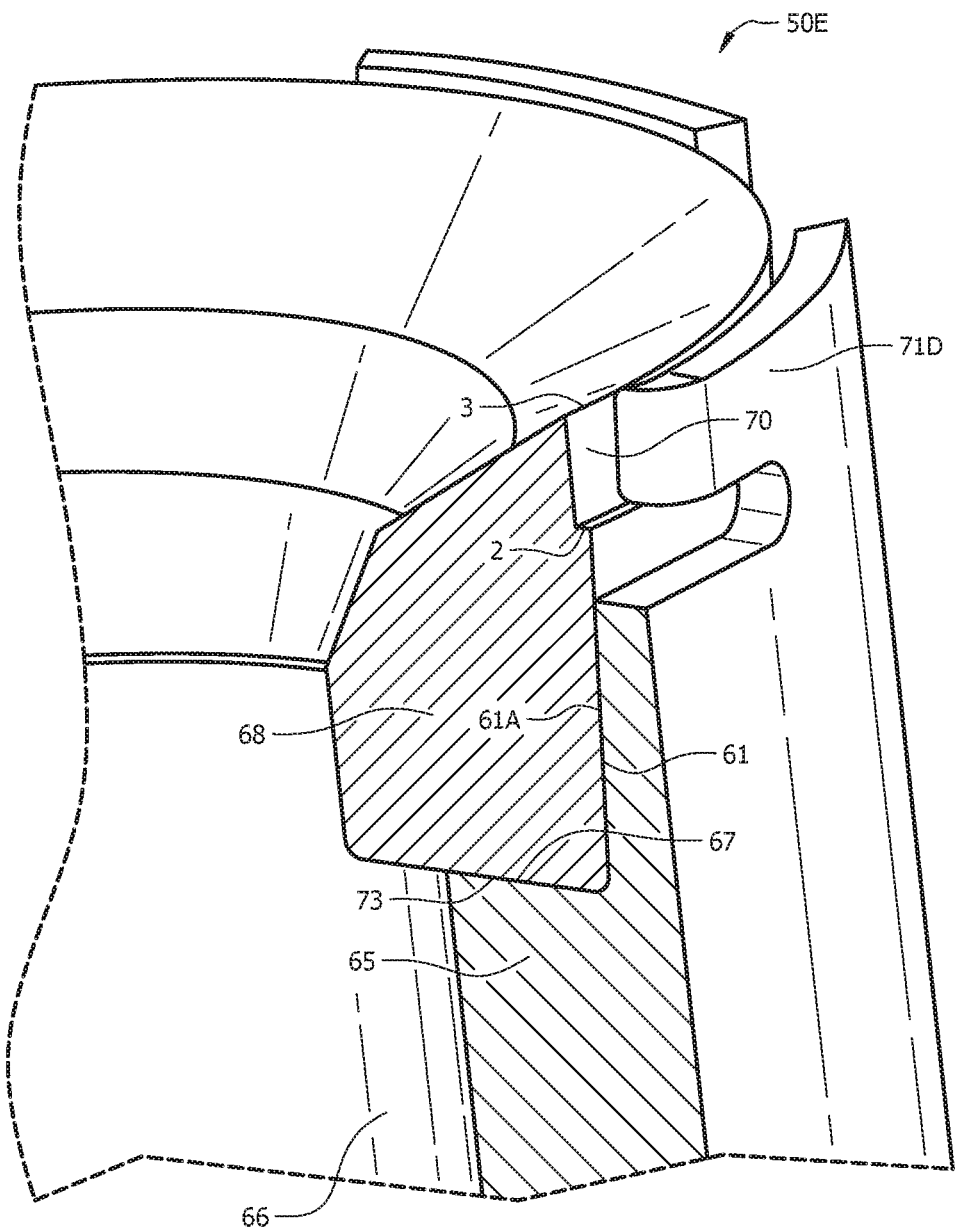
FIG. 9 is a schematic of a valve seat/valve seat housing assembly comprising a staking component, according to other embodiments of this disclosure.

FIG. 9 is a schematic of a valve seat/valve seat housing assembly 50E, according to embodiments of this disclosure, comprising a staking component insertion element 71D. In the embodiment of FIG. 9, the primary retention component comprises a locking taper OD 61 of the valve seat 68, and the secondary retention component comprises a groove 70 about an outer circumference of valve seat 68 and an insertion element 71D comprising a staking component.

In embodiments, staking component 71D of valve seat housing 65 can be inserted (e.g., pressed and/or hammered) into groove 70. In the embodiment of FIG. 9, the groove 70 is designed to receive a portion of staking component 71D, such that valve seat 68 can be at least temporarily retained in the valve seat housing 65 during seating of the valve seat 68 in the valve seat housing 65 via the secondary retention component comprising groove 70 and staking component 71D. Staking component 71D can comprise, for example, a piece of valve seat housing 65 operable to be manipulated into groove 70, for example, via hammering from the outside of valve seat housing 65.

Although depicted in FIGS. 5A-7B as contacting bottom 2 of groove 70 prior to seating of valve seat 68 in valve seat housing 65, the insertion element (e.g., tab 71A, ring 71B, pin 71C, staking component 71D) need not contact bottom 2 of groove 70 when initially inserted within groove 70. Similarly, although depicted in FIGS. 5A-7B as contacting top 3 of groove 70 upon seating of valve seat 68 fully in valve seat housing 65, the insertion element (e.g., tab 71A, ring 71B, pin 71C, staking component 71D) need not contact top 3 of groove 70 when valve seat 68 is fully seated within valve seat housing 65.

Also disclosed herein are a pump fluid end 22 comprising a valve seat 68 or a valve seat/valve seat assembly 50A/50B/50C of this disclosure, and a pump 10 comprising such a pump fluid end 22. The pump can be a wellbore servicing pump, in embodiments. Such a wellbore servicing pump 10 (FIG. 1) comprises a pump power end 12 (FIG. 1) and a pump fluid end 22 comprising the valve seat 68 or the valve seat assembly in a seated configuration (e.g., FIGS. 5B/6B/7B/8B/9), in which the valve seat 68 is seated in the valve seat housing 65.

In embodiments, the pump fluid end 22 of a wellbore servicing pump 10 of this disclosure is a cross-bore bore pump fluid end, such as depicted in FIG. 2, and described hereinabove. In embodiments, the pump fluid end 22 of a wellbore servicing pump 10 of this disclosure is a concentric pump fluid end, such as depicted in FIG. 3, and described hereinabove. In embodiments, the valve seat is a suction valve seat of a suction valve assembly 56. In embodiments, the valve seat is a discharge valve seat of a discharge valve assembly 72.

In embodiments, discharge valve assembly 72 and/or suction valve assembly 56 comprises a valve assembly having a valve guide, as described, for example, in U.S. patent application Ser. No. 16/411,910, filed May 14, 2019, and is entitled "Valve Assembly for a Fluid End with Limited Access", the disclosure of which is hereby incorporated herein in its entirety for purposes not contrary to this disclosure.

In embodiments, pump fluid end 22 comprises a packing assembly, such that packing 29, a packing carrier, and a packing screw can be removed from back S2 of pump fluid end 22 when crankshaft 16 is at TDC, as described, for example, in U.S. patent application Ser. No. 16/411,911, filed May 14, 2019, and is entitled "Pump Fluid End with Positional Indifference for Maintenance", the disclosure of which is hereby incorporated herein in its entirety for purposes not contrary to this disclosure.

In embodiments, pump fluid end 22 is a pump fluid end 22 with an easy access suction valve, as described, for example, in U.S. patent application Ser. No. 16/411,891, filed May 14, 2019, and is entitled "Pump Fluid End with Easy Access Suction Valve", the disclosure of which is hereby incorporated herein in its entirety for purposes not contrary to this disclosure.

In embodiments, the pump fluid end 22 is a concentric bore pump fluid end 22, the valve seat is a suction valve seat, and the suction valve seat (e.g., suction valve assembly 56 as shown in FIG. 3) is seated in a suction valve seat housing 65 located in a reciprocating element 18 (e.g., front end 60 of bore 24 as shown in FIG. 3). In such concentric bore suction valve assembly 56 embodiments, bore 66 of valve seat housing 65 comprises a bore of a hollow reciprocating element 18. In embodiments, the pump fluid end 22 is a concentric bore pump fluid end 22, the valve seat is a discharge valve seat, and the discharge valve seat is seated in a discharge valve seat housing 65 comprising an inside surface of a pump chamber 28 and/or discharge chamber 53 of pump fluid end body 8 (FIG. 3). In such concentric bore discharge valve assembly 72 embodiments bore 66 of valve seat housing 65 can comprise a bore of reciprocating element 18, discharge chamber 53, or pump chamber 28. In some concentric bore pump fluid end 22 embodiments, pump 10 comprises a flexible manifold, as described, for example, in U.S. patent application Ser. No. 16/411,901, filed May 14, 2019, and is entitled "Flexible Manifold for Reciprocating Pump", the disclosure of which is hereby incorporated herein in its entirety for purposes not contrary to this disclosure.

In embodiments, reciprocating element 18 comprises tool engagement features on front 60 thereof, whereby reciprocating element 18 can be removed from pump fluid end 22 by engaging a tool with the engagement features, as described, for example, in U.S. patent application Ser. No. 16/411,905, filed May 14, 2019, and is entitled "Pump Plunger with Wrench Features", the disclosure of which is hereby incorporated herein in its entirety for purposes not contrary to this disclosure.

In embodiments, reciprocating element 18 is coupled with a pushrod 30 of pump power end 12 via a reciprocating element adapter, as described, for example, in U.S. patent application Ser. No. 16/411,894, filed May 14, 2019, and is entitled "Easy Change Pump Plunger", the disclosure of which is hereby incorporated herein in its entirety for purposes not contrary to this disclosure.

Also disclosed herein is a method of seating a valve seat 68 in a valve seat housing 65 of a pump fluid end 22. The method comprises placing the valve seat 68 in the valve seat housing 65. The valve seat 68 and the valve seat housing 65 can be as described hereinabove. The method further comprises engaging a secondary retention component to at least temporarily retain the valve seat 68 in the valve seat housing 65 during seating of the valve seat 68 in the valve seat housing 65. The secondary retention component can comprise a groove and an insertion component, as described hereinabove. Engaging of the secondary retention component can comprise inserting at least a portion of the insertion component (e.g., 71A, 71B, 71C) in the groove 70. The inserting can comprise hammering, threading, snapping, or any other means known to one of skill in the art and with the help of this disclosure to be operable to insert the at least a portion of the insertion component into groove 70. Hammering or pressing valve seat 68 into place could be utilized with tab insertion element 71A, such as depicted in the embodiment of FIGS. 5A and 5B and ring insertion element 71B, such as depicted in the embodiment of FIGS. 6A and 6B. Hammering or pressing the pin insertion element 71C into place could be utilized in embodiment such as depicted in the embodiment of FIGS. 7A and 7B. The pressing could be accomplished, for example, with any type of press apparatus known to those of skill in the art and with the help of this disclosure, for example, without limitation, a hydraulic press, arbor press, or jack screw.

The method further comprises fully seating the valve seat 68 in the valve seat housing, 65, whereafter the valve seat 68 is primarily retained in the valve seat housing 65 via the primary retention component. The primary retention component can comprise a locking taper outside diameter 61, as described hereinabove. Fully seating the valve seat 68 in the valve seat housing 65 comprises contacting the valve seat contact surface 73 of the valve seat housing 65 distal the valve body contact surface 68 of the valve seat 68 with a valve seat housing contact surface 67 of the valve seat 68 distal the valve body contact surface 69 of valve seat 68. The valve body contact surface 69 is a surface of the valve seat 68 configured to contact a valve body of the valve assembly (e.g., suction valve assembly 56 or discharge valve assembly 72) comprising the valve seat 68 and the valve body when the valve assembly is closed. Contacting valve seat contact surface 73 of valve seat housing 65 distal valve body contact surface 68 of valve seat 68 with valve seat housing contact surface 67 of valve seat 68 distal valve body contact surface 69 of valve seat 68 (i.e., fully seating valve seat 68) can be effected via any means known to one of skill in the art and with the help of this disclosure. For example, without limitation, contacting valve seat contact surface 73 of valve seat housing 65 distal valve body contact surface 69 of valve seat 68 with valve seat housing contact surface 67 of valve seat 68 distal valve body contact surface 69 of valve seat 68 can be effected by applying hydraulic pressure to the valve seat 68. Applying hydraulic pressure to valve seat 68 can be effected, for example, by pumping with the pump 10 through a choke, a closed stop or valve, commencing normal pumping operations (e.g., pumping of a wellbore servicing fluid, as detailed further hereinbelow), or via a static pressure test with pressure being supplied by another, separate pump.

Figure 10:
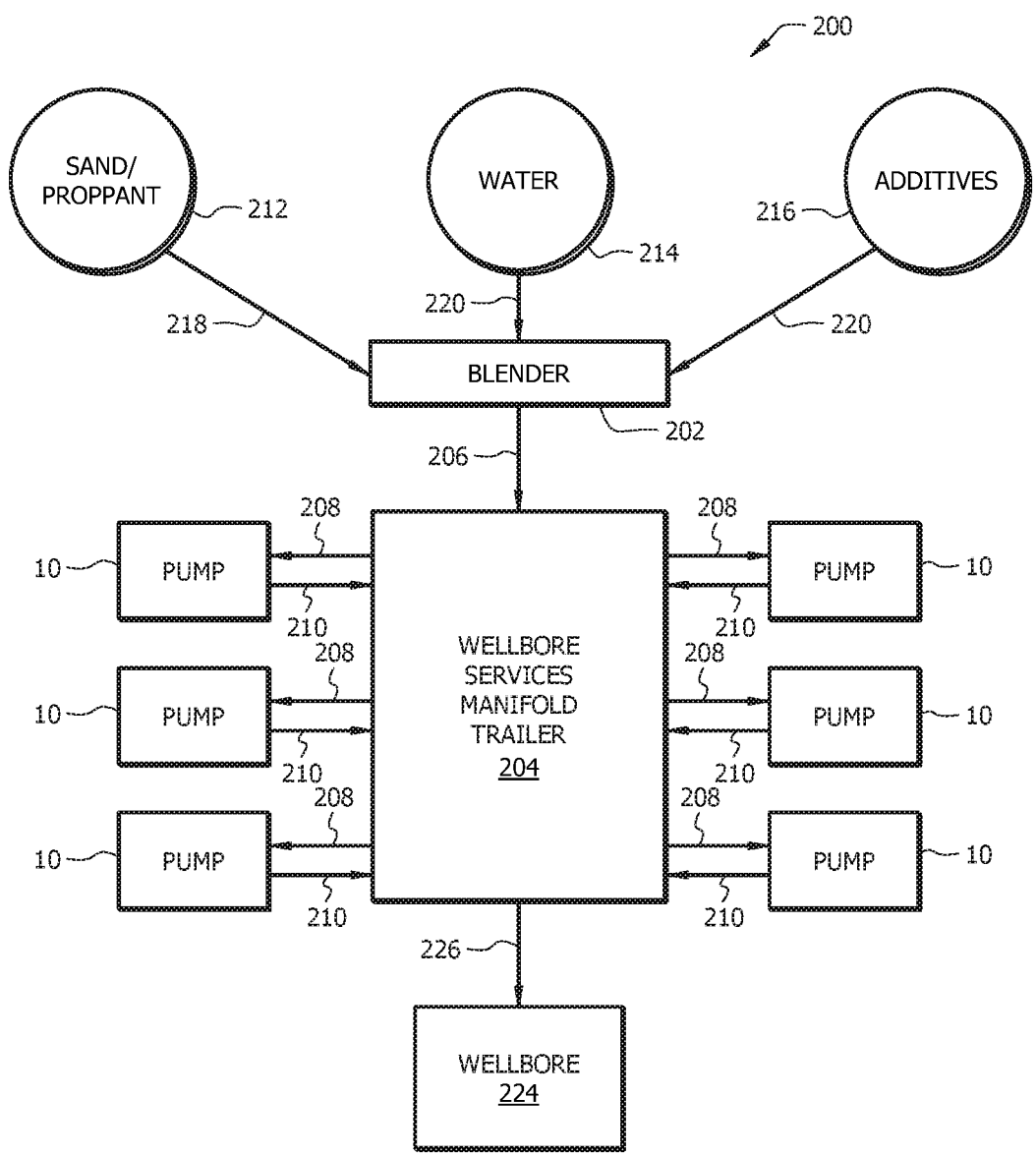
FIG. 10 is a schematic representation of an embodiment of a wellbore servicing system, according to embodiments of this disclosure.

Also disclosed herein are a method of servicing a wellbore and a wellbore servicing system 200 comprising a pump 10 of this disclosure. An embodiment of a wellbore servicing system 200 and a method of servicing a wellbore via the wellbore servicing system 200 will now be described with reference to FIG. 10, which is a schematic representation of an embodiment of a wellbore servicing system 200, according to embodiments of this disclosure.

A method of servicing a wellbore 224 according to this disclosure comprises fluidly coupling a pump 10 of this disclosure to a source of a wellbore servicing fluid and to the wellbore, and communicating wellbore servicing fluid into the wellbore 224 via the pump 10. The method can further comprise discontinuing the communicating of the wellbore servicing fluid into the wellbore 224 via the pump 10, optionally subjecting the pump 10 to maintenance to provide a maintained pump 10, and communicating the or another wellbore servicing fluid into the wellbore via the maintained pump 10. Subjecting the pump 10 to maintenance to provide a maintained pump can comprise seating a new valve seat 68 within pump 10, via the method of seating described herein.

It will be appreciated that the wellbore servicing system 200 disclosed herein can be used for any purpose. In embodiments, the wellbore servicing system 200 may be used to service a wellbore 224 that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids or completion fluids, and gravel pack fluids, remedial fluids, perforating fluids, sealants, drilling fluids, completion fluids, gelation fluids, polymeric fluids, aqueous fluids, oleaginous fluids, etc.

In embodiments, the wellbore servicing system 200 comprises one or more pumps 10 operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof. Although a wellbore servicing system is illustrated, skilled artisans will readily appreciate that the pump 10 disclosed herein may be employed in any suitable operation.

In embodiments, the wellbore servicing system 200 may be a system such a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., such as pump 10) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted by nitrogen or carbon dioxide; some in a foaming condition.

In embodiments, the blender 202 may be an Advanced Dry Polymer (ADP) blender and the additives 216 are dry blended and dry fed into the blender 202. In alternative embodiments, however, additives may be pre-blended with water using other suitable blenders, such as, but not limited to, a GEL PRO blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 (e.g., pump(s) 10 and/or maintained pump(s) 10) pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 3,000 psi, 5,000 psi, 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. in embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. In embodiments, each pump 10 (e.g., each pump 10 or maintained pump 10) operates during the pumping of the wellbore servicing fluid or the another wellbore servicing fluid at a volumetric flow rate of greater than or equal to about 3, 10, or 20 barrels per minute (BPM), or in a range of from about 3 to about 20, from about 10 to about 20, or from about 5 to about 20 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore (e.g., wellbore 224). Without limitation, servicing the wellbore may include: positioning the wellbore servicing composition in the wellbore 224 (e.g., via one or more pumps 10 as described herein) to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10 disclosed herein.

In alternative embodiments, the reciprocating apparatus may comprise a compressor. In embodiments, a compressor similar to the pump 10 may comprise at least one each of a cylinder, plunger, connecting rod, crankshaft, and housing, and may be coupled to a motor. In embodiments, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In embodiments, a reciprocating apparatus comprises an internal combustion engine, hereinafter referred to as an engine. Such engines are also well known, and typically include at least one each of a plunger, cylinder, connecting rod, and crankshaft. The arrangement of these components is substantially the same in an engine and a pump (e.g. pump 10). A reciprocating element 18 such as a plunger may be similarly arranged to move in reciprocating fashion within the cylinder. Skilled artisans will appreciate that operation of an engine may somewhat differ from that of a pump. In a pump, rotational power is generally applied to a crankshaft acting on the plunger via the connecting rod, whereas in an engine, rotational power generally results from a force (e.g., an internal combustion) exerted on or against the plunger, which acts against the crankshaft via the connecting rod.

For example, in a typical 4-stroke engine, arbitrarily beginning with the exhaust stroke, the plunger is fully extended during the exhaust stroke, (e.g., minimizing the internal volume of the cylinder). The plunger may then be retracted by inertia or other forces of the engine componentry during the intake stroke. As the plunger retracts within the cylinder, the internal volume of cylinder increases, creating a low pressure within the cylinder into which an air/fuel mixture is drawn. When the plunger is fully retracted within the cylinder, the intake stroke is complete, and the cylinder is substantially filled with the air/fuel mixture. As the crankshaft continues to rotate, the plunger may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. In a diesel engine, however, the spark plug may be omitted, as the heat of compression derived from the high compression ratios associated with diesel engines suffices to provide spontaneous combustion of the air-fuel mixture. In either case, the heat and pressure act forcibly against the plunger and cause it to retract back into the cylinder during the power cycle at a substantial force, which may then be exerted on the connecting rod, and thereby on to the crankshaft.

Those of ordinary skill in the art will readily appreciate various benefits that may be realized by the present disclosure. For instance, assembling a valve seat/valve seat housing assembly and maintenance to replace a valve seat within a valve seat housing can be costly and time consuming. Pump valve seats 68 can be primarily retained in the pump fluid end 22 by a primary retention component (e.g., a locking taper 61 on the outside diameter of the valve seat 68). In order to fully seat the valve seat 68 in the valve seat housing 65, such that the primary retention component can be fully engaged with and hold the valve seat 68 in the pump fluid end 22 during pumping, a load must be applied to the valve seat 68. The load can be applied to the valve seat 68 with fluid pressure by performing a static pressure test. However, pump flow rate is sometimes utilized to create fluid pressure sufficient to fully seat the valve seat 68 and thus retain the valve seat 68 in the valve seat housing 65 via the primary retention component. Utilization of a valve seat 68 having a secondary retention component, as described herein, can prevent "pump out" of the valve seat 68 during such loading prior to fully seating the valve seat 68. Problems encountered during valve seat installation can cause unnecessary down time and can damage expensive valve seats 68. Furthermore, damage to other internal components of pump fluid end 22 can occur should valve seat 68 pump out during valve seat seating. Accordingly, a valve seat 68, a valve seat/valve seat housing assembly 50A/50B/50C comprising the valve seat 68, a pump fluid end 22 comprising the valve seat/valve seat housing 50A/50B/50C, and a pump 10 comprising the pump fluid end 22 according to this disclosure can facilitate seating of a valve seat 68 in a valve seat housing 65 and reduce and/or eliminate the possibility of undesirable pump out of the valve seat 68 prior to fully seating in the valve seat housing 65, and thus potentially reduce maintenance and/or assembly time.

Additional Disclosure

The following are non-limiting, specific embodiments in accordance with the present disclosure:

Embodiment A: A valve seat comprising: a primary retention component to retain the valve seat in a valve seat housing upon seating of the valve seat in the valve seat housing; and a secondary retention component to at least temporarily retain the valve seat in the valve seat housing during seating of the valve seat in the valve seat housing, whereafter the valve seat is primarily retained in the valve seat housing via the primary retention component.

Embodiment B: The valve seat of Embodiment A, wherein the primary retention component comprises a locking taper outer diameter (OD).

Embodiment C: The valve seat of embodiment A or Embodiment B, wherein the valve seat housing comprises part of a reciprocating element.

Embodiment D: The valve seat of any of Embodiment A through Embodiment C, wherein the valve seat housing comprises part of a pump fluid end.

Embodiment E: The valve seat of any of Embodiment B through Embodiment D, wherein the secondary retention component comprises a groove about an outer circumference of the locking taper OD.

Embodiment F: The valve seat of Embodiment E, wherein the groove is continuous or discontinuous about the outer circumference of the locking taper OD.

Embodiment G: The valve seat of Embodiment E or Embodiment F, wherein the groove is designed to receive a tab of the valve seat housing.

Embodiment H: The valve seat of Embodiment G, wherein the groove is continuous or discontinuous about the outer circumference of the locking taper OD.

Embodiment I: The valve seat of any of Embodiment G through Embodiment H, wherein a height of the groove along a direction parallel to a central axis of the valve seat is greater than a height of the tab along the direction parallel to the central axis of the valve seat when the valve seat is seated in the valve seat housing, such that the valve seat may move an axial distance adequate to fully seat the valve seat within the valve seat housing during seating of the valve seat in the valve seat housing whereafter the valve seat is primarily retained in the valve seat housing via the primary retention component.

Embodiment J: The valve seat of Embodiment E or Embodiment I, wherein the groove is continuous about the outer circumference of the locking taper OD, and wherein the groove is configured such that a snap ring or a staking component can be positioned in the groove between the valve seat housing and the valve seat.

Embodiment K: The valve seat of Embodiment E or Embodiment I, wherein the groove is configured to receive a roll pin passing through the valve seat housing.

Embodiment L: A pump fluid end comprising: a valve seat housing; and a valve seat comprising: a primary retention component to retain the valve seat in the valve seat housing upon seating of the valve seat in the valve seat housing; and a secondary retention component to at least temporarily retain the valve seat in the valve seat housing during seating of the valve seat in the valve seat housing via the primary retention component.

Embodiment M: The pump fluid end of Embodiment L, wherein the primary retention component comprises a locking taper outer diameter (OD).

Embodiment N: The pump fluid end of Embodiment L or Embodiment M, wherein the valve seat housing comprises part of a reciprocating element.

Embodiment O: The pump fluid end of Embodiment L or Embodiment M, wherein the valve seat housing comprises part of a body of the pump fluid end.

Embodiment P: The pump fluid end of any of Embodiment L through Embodiment O, wherein the secondary retention component comprises a groove about an outer circumference of the locking taper OD.

Embodiment Q: The pump fluid end of any of Embodiment L through Embodiment P, wherein the groove is continuous or discontinuous about the outer circumference of the locking taper OD.

Embodiment R: The pump fluid end of Embodiment P or Embodiment Q, wherein the valve seat housing comprises a tab about an inner circumference thereof, and located such that the tab can be positioned within the groove of the valve seat during seating of the valve seat in the valve seat housing.

Embodiment S: The pump fluid end of Embodiment R, wherein the tab is continuous or discontinuous about the inner circumference of the valve seat housing.

Embodiment T: The pump fluid end of any of Embodiment P through Embodiment S, wherein a height of the groove along a direction parallel to a central axis of the valve seat is greater than a height of the tab along the direction parallel to the central axis of the valve seat when the valve seat is seated in the valve seat housing, such that the valve seat may move axially a distance adequate to fully seat the valve seat within the valve seat housing during seating of the valve seat in the valve seat housing whereafter the valve seat is primarily retained in the valve seat housing via the primary retention component.

Embodiment U: The pump fluid end of Embodiment P or Embodiment T, wherein the groove is continuous about the outer circumference of the locking taper OD, and wherein the secondary retention component further comprises a snap ring or a staking component in the groove between the valve seat housing and the valve seat.

Embodiment V: The pump fluid end of any of Embodiment P, Embodiment Q, or Embodiment T, wherein the secondary retention component further comprises a roll pin, a screw, a dowel pin, a rivet, a threaded fastener, or a combination thereof passing through a part of the valve seat housing and into the groove.

Embodiment W: A method of seating a valve seat in a valve seat housing of a pump fluid end, the method comprising: prior to fully seating the valve seat in the valve seat housing, whereafter the valve seat is retained in the valve seat housing primarily by a primary retention component, temporarily retaining the valve seat in the valve seat housing via a secondary retention component disparate from the primary retention component, wherein fully seating the valve seat in the valve seat housing comprises contacting the valve seat housing with a surface of the valve seat opposite a contact surface of the valve seat, wherein the contact surface of the valve seat is a surface of the valve seat configured to contact a valve body of a valve assembly comprising the valve seat and the valve body when the valve assembly is closed.

Embodiment X: The method of Embodiment W, wherein the valve seat housing comprises part of a reciprocating element.

Embodiment Y: The method of Embodiment W, wherein the valve seat housing comprises part of a pump fluid end body.

Embodiment Z: The method of any of Embodiment W through Embodiment Y, wherein the primary retention component comprises a locking taper outer diameter (OD).

Embodiment Z1: The method of Embodiment Z, wherein the secondary retention component comprises a groove about an outer circumference of the locking taper OD, and wherein temporarily retaining the valve seat in the valve seat housing comprises positioning an insertion component at least partially in the groove between the valve seat housing and the valve seat.

Embodiment Z2: The method of Embodiment Z1, wherein the groove is continuous or discontinuous about the outer circumference of the locking taper OD.

Embodiment Z3: The method of Embodiment Z1 or Embodiment Z2, wherein the insertion component comprises a tab of the valve seat housing.

Embodiment Z4: The method of Embodiment Z3, wherein the tab is continuous or discontinuous about the outer circumference of the locking taper OD when the tab is positioned in the groove between the valve seat housing and the valve seat.

Embodiment Z5: The method of any of Embodiment Z1 through Embodiment Z4, wherein a height of the groove along a direction parallel to a central axis of the valve seat is greater than a height of the tab along the direction parallel to the central axis of the valve seat when the valve seat is seated in the valve seat housing, such that the valve seat may move axially a distance adequate to fully seat the valve seat within the valve seat housing during seating of the valve seat in the valve seat housing whereafter the valve seat is primarily retained in the valve seat housing via the primary retention component.

Embodiment Z6: The method of any of Embodiment Z1, Embodiment Z2, or Embodiment Z5, wherein the groove is continuous about the outer circumference of the locking taper OD, and wherein the insertion component comprises a snap ring or a staking component positioned in the groove between the valve seat housing and the valve seat.

Embodiment Z7: The method of Embodiment Z1, Embodiment Z2, or Embodiment Z5, wherein the insertion component comprises a roll pin, a screw, a dowel pin, a rivet, a threaded fastener, or a combination thereof passing through a part of the valve seat housing and into the groove.

Embodiment Z8: A method of seating a valve seat in a valve seat housing of a pump fluid end, the method comprising: placing the valve seat in the valve seat housing; engaging a secondary retention component to at least temporarily retain the valve seat in the valve seat housing during seating of the valve seat in the valve seat housing; and fully seating the valve seat in the valve seat housing, whereafter the valve seat is primarily retained in the valve seat housing via a primary retention component, wherein fully seating the valve seat in the valve seat housing comprises contacting the valve seat housing with a surface of the valve seat opposite a contact surface of the valve seat, wherein the contact surface of the valve seat is a surface of the valve seat configured to contact a valve body of a valve assembly comprising the valve seat and the valve body when the valve assembly is closed.

Embodiment Z9: The method of Embodiment Z8 wherein the primary retention component comprises a locking taper outer diameter (OD) and wherein fully seating the valve seat in the valve seat housing comprises applying hydraulic pressure to the valve seat.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A valve seat comprising:
a primary retention component to retain the valve seat in a valve seat housing upon seating of the valve seat in the valve seat housing, wherein the primary retention component comprises a locking taper outer diameter (OD), wherein the locking taper OD extends an entire axial length of the valve seat along a central axis thereof and is tapered along the entire axial length; and a secondary retention component to at least temporarily retain the valve seat in the valve seat housing during seating of the valve seat in the valve seat housing, whereafter the valve seat is primarily retained in the valve seat housing via the primary retention component, wherein the valve seat housing comprises part of a reciprocating element or part of a pump fluid end body and wherein the secondary retention component comprises a groove about an outer circumference of the locking taper OD.

2. The valve seat of claim 1, wherein the groove is designed to receive a tab of the valve seat housing, wherein the tab extends inward toward the central axis.

3. The valve seat of claim 2, wherein a height of the groove along a direction parallel to a central axis of the valve seat is greater than a height of the tab along the direction parallel to the central axis of the valve seat when the valve seat is seated in the valve seat housing, such that the valve seat may move an axial distance adequate to fully seat the valve seat within the valve seat housing during seating of the valve seat in the valve seat housing whereafter the valve seat is primarily retained in the valve seat housing via the primary retention component.

4. The valve seat of claim 1, wherein the groove is continuous about the outer circumference of the locking taper OD, and wherein the groove is configured for positioning of a snap ring or a staking component in the groove between the valve seat housing and the valve seat.

5. The valve seat of claim 1, wherein the groove is configured to receive a roll pin passing through the valve seat housing.

6. A pump fluid end comprising:
a valve seat housing; and
a valve seat comprising:
  a primary retention component to retain the valve seat in the valve seat housing upon seating of the valve seat in the valve seat housing, wherein the primary retention component comprises a locking taper outer diameter (OD), wherein the locking taper OD extends an entire axial length of the valve seat along a central axis thereof and is tapered along the entire axial length; and
  a secondary retention component to at least temporarily retain the valve seat in the valve seat housing during seating of the valve seat in the valve seat housing via the primary retention component,
wherein the valve seat housing comprises part of a reciprocating element or part of a pump fluid end body and wherein the secondary retention component comprises a groove about an outer circumference of the locking taper OD.

7. The pump fluid end of claim 6, wherein the valve seat housing comprises a tab about an inner circumference thereof, wherein the tab extends inward toward the central axis and is located for positioning of the tab within the groove of the valve seat during seating of the valve seat in the valve seat housing.

8. The pump fluid end of claim 7, wherein a height of the groove along a direction parallel to a central axis of the valve seat is greater than a height of the tab along the direction parallel to the central axis of the valve seat when the valve seat is seated in the valve seat housing, such that the valve seat may move axially a distance adequate to fully seat the valve seat within the valve seat housing during seating of the valve seat in the valve seat housing whereafter the valve seat is primarily retained in the valve seat housing via the primary retention component.

9. The pump fluid end of claim 6, wherein the secondary retention component further comprises a snap ring or a staking component in the groove between the valve seat housing and the valve seat, or a roll pin, a screw, a dowel pin, a rivet, a threaded fastener, or a combination thereof passing through a part of the valve seat housing and into the groove.

10. A method of seating a valve seat in a valve seat housing of a pump fluid end, the method comprising:
prior to fully seating the valve seat in the valve seat housing, whereafter the valve seat is retained in the valve seat housing primarily by a primary retention component, temporarily retaining the valve seat in the valve seat housing via a secondary retention component disparate from the primary retention component,
wherein the primary retention component comprises a locking taper outer diameter (OD), wherein the locking taper OD extends an entire axial length of the valve seat along a central axis thereof and is tapered along the entire axial length,
wherein fully seating the valve seat in the valve seat housing comprises contacting the valve seat housing with a surface of the valve seat opposite a valve body contact surface of the valve seat, wherein the valve body contact surface of the valve seat is a surface of the valve seat configured to contact a valve body of a valve assembly comprising the valve seat and the valve body when the valve assembly is closed, and
wherein the valve seat housing comprises part of a reciprocating element or part of a pump fluid end body, wherein the secondary retention component comprises a groove about an outer circumference of the locking taper OD, and wherein temporarily retaining the valve seat in the valve seat housing comprises positioning an insertion component at least partially in the groove between the valve seat housing and the valve seat.

11. The method of claim 10, wherein the insertion component comprises a tab or a staking component of the valve seat housing that extends inward toward the central axis.

12. The method of claim 11, wherein the tab is continuous or discontinuous about the outer circumference of the locking taper OD when the tab is positioned in the groove between the valve seat housing and the valve seat.

13. The method of claim 11, wherein a height of the groove along a direction parallel to a central axis of the valve seat is greater than a height of the tab along the direction parallel to the central axis of the valve seat when the valve seat is seated in the valve seat housing, such that the valve seat may move axially a distance adequate to fully seat the valve seat within the valve seat housing during seating of the valve seat in the valve seat housing whereafter the valve seat is primarily retained in the valve seat housing via the primary retention component.

14. The method of claim 10, wherein the insertion component comprises a snap ring or a staking component positioned in the groove between the valve seat housing and the valve seat, or a roll pin, a screw, a dowel pin, a rivet, a threaded fastener, or a combination thereof passing through a part of the valve seat housing and into the groove.

15. A valve seat comprising:
a primary retention component to retain the valve seat in a valve seat housing upon seating of the valve seat in the valve seat housing, wherein the primary retention component comprises a locking taper outer diameter (OD), wherein the locking taper OD extends an entire axial length of the valve seat along a central axis thereof and is tapered along the entire axial length; and a secondary retention component to at least temporarily retain the valve seat in the valve seat housing during seating of the valve seat in the valve seat housing, whereafter the valve seat is primarily retained in the valve seat housing via the primary retention component, wherein the valve seat housing comprises part of a reciprocating element or part of a pump fluid end body, wherein seating of the valve seat in the valve seat housing indicates that a valve seat housing contact surface of the valve seat distal a valve body contact surface of the valve seat contacts a valve seat contact surface of the valve seat housing, and wherein the valve seat housing contact surface of the valve seat distal the valve body contact surface of the valve seat and the valve seat contact surface of the valve seat housing that contacts the valve seat housing contact surface of the valve seat distal the valve body contact surface of the valve seat upon seating are each perpendicular to the central axis.

16. A pump fluid end comprising:
a valve seat housing; and
a valve seat comprising:
  a primary retention component to retain the valve seat in the valve seat housing upon seating of the valve seat in the valve seat housing, wherein the primary retention component comprises a locking taper outer diameter (OD), wherein the locking taper OD extends an entire axial length of the valve seat along a central axis thereof and is tapered along the entire axial length; and
  a secondary retention component to at least temporarily retain the valve seat in the valve seat housing during seating of the valve seat in the valve seat housing via the primary retention component,
wherein the valve seat housing comprises part of a reciprocating element or part of a pump fluid end body,
wherein seating of the valve seat in the valve seat housing indicates that a valve seat housing contact surface of the valve seat distal a valve body contact surface of the valve seat contacts a valve seat contact surface of the valve seat housing, and
wherein the valve seat housing contact surface of the valve seat distal the valve body contact surface of the valve seat and the valve seat contact surface of the valve seat housing that contacts the valve seat housing contact surface of the valve seat distal the valve body contact surface of the valve seat upon seating are each perpendicular to the central axis.

17. A method of seating a valve seat in a valve seat housing of a pump fluid end, the method comprising:
prior to fully seating the valve seat in the valve seat housing, whereafter the valve seat is retained in the valve seat housing primarily by a primary retention component, temporarily retaining the valve seat in the valve seat housing via a secondary retention component disparate from the primary retention component,
wherein the primary retention component comprises a locking taper outer diameter (OD), wherein the locking taper OD extends an entire axial length of the valve seat along a central axis thereof and is tapered along the entire axial length,
wherein fully seating the valve seat in the valve seat housing comprises contacting the valve seat housing with a surface of the valve seat opposite a valve body contact surface of the valve seat,
wherein the valve body contact surface of the valve seat is a surface of the valve seat configured to contact a valve body of a valve assembly comprising the valve seat and the valve body when the valve assembly is closed,
wherein the valve seat housing comprises part of a reciprocating element or part of a pump fluid end body, and
wherein the valve seat housing contact surface of the valve seat distal the valve body contact surface of the valve seat and the valve seat contact surface of the valve seat housing that contacts the valve seat housing contact surface of the valve seat distal the valve body contact surface of the valve seat upon seating are each perpendicular to the central axis.

* * * * *

UNITED STATES PATENT AND TRADEMARK OFFICE
CERTIFICATE OF CORRECTION

PATENT NO. : 11,231,111 B2  
APPLICATION NO. : 16/411898  
DATED : January 25, 2022  
INVENTOR(S) : Justin Lee Hurst et al.

Page 1 of 1

It is certified that error appears in the above-identified patent and that said Letters Patent is hereby corrected as shown below:

In the Specification

Column 19, after Line 19, Insert the following paragraph:
--In embodiments, the pump fluid end 22 is a cross-bore pump fluid end 22, the valve seat is a suction valve seat, and the suction valve seat is seated in a suction valve seat housing 65 comprising an inside surface of cross bore 25 of fluid end body 8, on a side of central axis 17 opposite a discharge valve assembly 72 (FIG. 2). In embodiments, the pump fluid end 22 is a cross-bore pump fluid end 22, the valve seat 68 is a discharge valve seat 68, and the discharge valve seat 68 is seated in a discharge valve seat housing 65 comprising an inside surface of a cross bore 25 of fluid end body 8 on a side of central axis 17 opposite a suction valve assembly 56 (FIG. 2). In such cross-bore embodiments, bore 66 of valve seat housing 65 can comprise cross bore 25.--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*